(12) United States Patent
Nakano et al.

(10) Patent No.: US 11,472,159 B2
(45) Date of Patent: Oct. 18, 2022

(54) HIGH STRENGTH STEEL SHEET

(71) Applicant: NIPPON STEEL CORPORATION, Tokyo (JP)

(72) Inventors: Katsuya Nakano, Tokyo (JP); Kengo Takeda, Tokyo (JP); Hiroyuki Kawata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/415,794

(22) PCT Filed: Mar. 16, 2020

(86) PCT No.: PCT/JP2020/011551
§ 371 (c)(1),
(2) Date: Jun. 18, 2021

(87) PCT Pub. No.: WO2020/196060
PCT Pub. Date: Oct. 1, 2020

(65) Prior Publication Data
US 2022/0063245 A1 Mar. 3, 2022

(30) Foreign Application Priority Data

Mar. 28, 2019 (JP) .............................. JP2019-064514

(51) Int. Cl.
| | | |
|---|---|---|
| *B32B 15/01* | (2006.01) | |
| *C22C 38/00* | (2006.01) | |
| *C22C 38/02* | (2006.01) | |
| *C22C 38/06* | (2006.01) | |
| *C22C 38/22* | (2006.01) | |
| *C22C 38/26* | (2006.01) | |
| *C22C 38/28* | (2006.01) | |
| *C22C 38/58* | (2006.01) | |
| *C21D 6/00* | (2006.01) | |
| *C21D 8/02* | (2006.01) | |
| *C21D 9/46* | (2006.01) | |
| *C22C 38/32* | (2006.01) | |
| *C22C 38/42* | (2006.01) | |

(52) U.S. Cl.
CPC ............ *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 9/46* (2013.01); *C22C 38/001* (2013.01); *C22C 38/002* (2013.01); *C22C 38/005* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C22C 38/42* (2013.01); *C22C 38/58* (2013.01); *C21D 2211/008* (2013.01)

(58) Field of Classification Search
CPC . B32B 15/013; C22C 38/001; C22C 38/0002; C22C 38/005; C22C 38/02; C22C 38/06; C22C 38/22; C22C 38/26; C22C 38/28; C22C 38/58
USPC .......................................................... 428/659
See application file for complete search history.

(56) References Cited

U.S. PATENT DOCUMENTS

| | | |
|---|---|---|
| 2016/0160335 A1 | 6/2016 | Ikeda |
| 2017/0037488 A1 | 2/2017 | Hasegawa et al. |
| 2017/0211164 A1 | 7/2017 | Kimura et al. |

FOREIGN PATENT DOCUMENTS

| | | |
|---|---|---|
| JP | 2015-34334 A | 2/2015 |
| JP | 2015-117403 A | 6/2015 |
| WO | WO 2016/013145 A1 | 1/2016 |

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A high strength steel sheet comprising a center part of sheet thickness and a surface soft part formed at one side or two sides of the center part of sheet thickness, having metal structures of the center part of sheet thickness comprising, by area ratio, tempered martensite: 85% or more, one or more of ferrite, bainite, pearlite, and retained austenite: total of less than 15%, and as-quenched martensite: less than 5%, and additionally having metal structures of the surface soft part comprising, by area ratio, ferrite: 65% or more, pearlite: 5% or more and less than 20%, one or more of tempered martensite, bainite, and retained austenite: total of less than 10%, and as-quenched martensite: less than 5%, wherein a Vickers hardness (Hc) of the center part of sheet thickness and a Vickers hardness (Hs) of the surface soft part satisfy $0.50 \leq Hs/Hc \leq 0.75$.

10 Claims, No Drawings

HIGH STRENGTH STEEL SHEET

FIELD

The present invention relates to high strength steel sheet.

BACKGROUND

In recent years, from the viewpoint of improvement of fuel efficiency of automobiles for the purpose of environmental conservation etc., rendering steel sheets for automobile use higher in strength and thinner to lighten the weight of car bodies has been sought. In general, if steel sheet is raised in strength, it deteriorates in formability. However, the high strength steel sheet used for frame parts etc. of automobiles in recent years has also been required to be improved in formability such as hole expandability and ductility. Further, the working of high strength steel sheet is mainly bending. Good bendability is also important.

In this regard, in bending of steel sheet, tensile stress acts in the circumferential direction at the surface layer part at the outer circumference of the bend while compressive stress acts at the surface layer part at the inner circumference of the bend. For this reason, the condition of the surface layer part affects the bendability of the high strength steel sheet. Therefore, the technique of providing a soft layer at the surface layer part of the high strength steel sheet to thereby ease the tensile stress and compressive stress occurring at the surface layer part at the time of bending and improve the bendability of the high strength steel sheet has been known.

Regarding high strength steel sheet having a soft layer at such a surface layer part, the following PTLs 1 to 3 disclose the following steel sheets and methods for manufacturing the same.

First, in PTL 1, high strength plated steel sheet comprising a steel sheet and a plating layer having, from an interface of the same toward the steel sheet side, in order, an internal oxide layer containing oxides of Si and/or Mn, a soft layer containing the internal oxide layer, and a hard layer comprised of mainly structures of martensite and bainite wherein an average depth T of the soft layer is 20 μm or more and an average depth "t" of the internal oxide layer is 4 μm or more and less than T, and a method for manufacturing the same are described.

Next, in PTL 2, high strength hot dip galvanized steel sheet having a value (ΔHv) of the Vickers hardness at a position of 100 μm from the surface of the steel sheet minus the Vickers hardness at a position of a position of a depth of 20 μm from the surface of the steel sheet of 30 or more and a method for manufacturing the same are described.

Next, in PTL 3, high strength hot dip galvanized steel sheet having a Vickers hardness at a position of 5 μm from the surface layer in the sheet thickness direction of 80% or less of the hardness at a position of ½ of the sheet thickness direction and having a hardness at a position of 15 μm from the surface layer in the sheet thickness direction of 90% or more of the Vickers hardness at a position of ½ of the sheet thickness direction and a method for manufacturing the same are described.

CITATIONS LIST

Patent Literature

[PTL 1] Japanese Unexamined Patent Publication No. 2015-34334

[PTL 2] Japanese Unexamined Patent Publication No. 2015-117403

[PTL 3] WO2016/013145

SUMMARY

Technical Problem

However, high strength steel sheet used for frame parts of automobiles etc. are required to be improved in bendability and formability and simultaneously raised in the bending load.

Therefore, the present invention, in consideration of the state of the prior art, has as its object the provision of high strength steel sheet improved in formability, bending load, and bendability.

Solution to Problem

The inventors manufactured steel sheets having soft parts at the surface layers of the prior art and investigated them for bendability. Further, the inventors manufactured steel sheets having surface soft part in which hard structures were distributed in the soft structures at the surface layers so as to raise the bending load of the steel sheets and investigated them for bendability. As a result, they discovered that by utilizing pearlite as the hard structures to be distributed in the surface soft part and controlling the average distances between the pearlite and pearlite, the bending load and bendability of the steel sheet can be simultaneously raised. Furthermore, they discovered that by controlling the metal structures at the center part of sheet thickness in addition to controlling the metal structures at the surface soft part as explained above, high strength steel sheet more excellent in bendability and formability can be obtained. The gist of the present invention obtained in this way is as follows:

(1) A high strength steel sheet comprising a center part of sheet thickness and a surface soft part formed at one side or both sides of the center part of sheet thickness, wherein at a cross-section of the high strength steel sheet, metal structures at the center part of sheet thickness comprise, by area ratio, tempered martensite: 85% or more, one or more of ferrite, bainite, pearlite, and retained austenite: total of less than 15%, and as-quenched martensite: less than 5%, metal structures of the surface soft part comprise, by area ratio, ferrite: 65% or more, pearlite: 5% or more and less than 20%, one or more of tempered martensite, bainite, and retained austenite: total of less than 10%, and as-quenched martensite: less than 5%, a thickness of the surface soft part formed at one side or both sides is more than 10 μm and 15% or less of the sheet thickness, an average distance between pearlite and pearlite at the surface soft part is 3 μm or more, a Vickers hardness (Hc) of the center part of sheet thickness and a Vickers hardness (Hs) of the surface soft part satisfy 0.50≤Hs/Hc≤0.75, a chemical composition of the center part of sheet thickness comprises, by mass %, C: 0.10% or more and 0.30% or less, Si: 0.01% or more and 2.5% or less, Al: 0% or more and 2.50% or less, Mn: 0.1% or more and 10.0% or less, P: 0.10% or less, S: 0.050% or less, N: 0.0100% or less, O: 0.0060% or less, Cr: 0% or more and 5.0% or less, Mo: 0% or more and 1.00% or less, B: 0% or more and 0.0100% or less, Nb: 0% or more and 0.30% or less, Ti: 0% or more and 0.30% or less, V: 0% or more or 0.50% or less, Ni: 0% or more and 1.00% or less, Cu: 0% or more and 1.00% or less, Ca: 0% or more and 0.040% or less, Mg: 0% or more and 0.040% or less, REMs: 0% or more and 0.040% or less and a balance of Fe and impurities.

(2) The high strength steel sheet according to (1) wherein the chemical composition of the center part of the sheet thickness comprises, by mass %, one or more elements selected from Cr: 0.1% or more and 5.0% or less, Mo: 0.01% or more and 1.00% or less, B: 0.0001% or more and 0.0100% or less, Nb: 0.001% or more and 0.30% or less, Ti: 0.001% or more and 0.30% or less, V: 0.001% or more and 0.50% or less, Ni: 0.0001% or more and 1.00% or less, Cu: 0.001% or more and 1.00% or less, Ca: 0.001% or more and 0.040% or less, Mg: 0.001% or more and 0.040% or less, and REMs: 0.001% or more and 0.040% or less.

(3) The high strength steel sheet according to (1) or (2), wherein a content of C of the surface soft part is 0.9 time or less of the content of C of the center part of the sheet thickness.

(4) The high strength steel sheet according to any of (1) to (3), wherein the high strength steel sheet comprises a hot dip galvanized layer on its surface.

(5) The high strength steel sheet according to any of (1) to (3), wherein the high strength steel sheet comprises a hot dip galvannealed layer on its surface.

Advantageous Effects of Invention

According to the present invention, high strength steel sheet improved in formability, bending load, and bendability can be provided. Such high strength steel sheet of the present invention is for example preferable for frame parts of automobiles etc.

DESCRIPTION OF EMBODIMENTS

Below, embodiments of the present invention will be explained. Note that, the present invention is not limited to the following embodiments.

The high strength steel sheet of the present embodiment has a center part of sheet thickness and a surface soft part formed at one side or both sides of the center part of sheet thickness. First, the metal structures of the center part of sheet thickness and surface soft part will be explained. Note that, the fractions of the metal structures shown below show the ratios of the structures in the cross-section of high strength steel sheet by area ratios. Accordingly, in the explanation of the fractions of the metal structures, "%" means "area %".

Center Part of Sheet Thickness

First, the metal structures of the center part of sheet thickness are comprised of 85% or more of tempered martensite, a total of one or more of less than 15% of ferrite, bainite, pearlite, and retained austenite, and less than 5% of as-quenched martensite.

"Tempered Martensite: 85% or More"

Tempered martensite is a structure which high in dislocation density and hard and which contributes to improvement of the tensile strength of steel sheet. If the area ratio of the tempered martensite is less than 85%, steel sheet sometimes satisfies a 1180 MPa or more tensile strength while sufficient hole expandability cannot be obtained. This is because the uniformity of structures deteriorates. Therefore, the area ratio of tempered martensite is made 85% or more and may also be 100%.

"One or More of Ferrite, Bainite, Pearlite, and Retained Austenite: Total of Less Than 15%"

Ferrite is a soft structure, so easily deforms and contributes to improvement of the ductility of steel sheet. However, the interfaces of the hard structures and ferrite can become starting points of fracture. If ferrite is 15% or more, the interfaces which can become starting points of fracture increase in number, so sometimes deterioration of the hole expandability of steel sheet is invited. For this reason, ferrite is made less than 15% and may also be zero.

Bainite includes high dislocation density lath shaped bainitic ferrite and interfaces of bainitic ferrite or internal carbides and is hard. For this reason, bainite contributes to improvement of the tensile strength of steel sheet. If bainite is 15% or more, the steel sheet can satisfy 1180 MPa or more of tensile strength, but the uniformity of the structures deteriorates and sometimes deterioration of the hole expandability is invited. For this reason, bainite is made less than 15% and may also be zero.

Retained austenite is a structure which contributes to improvement of the ductility of the steel sheet due to deformation induced transformation (Transformation Induced Plasticity: TRIP) effect. On the other hand, retained austenite transforms to as-quenched martensite due to deformation induced transformation, so sometimes causes deterioration of the hole expandability of steel sheet. For this reason, retained austenite is made less than 15% and may also be zero.

Pearlite is a hard structure comprised of soft ferrite and hard cementite arranged in layers and a structure which contributes to improvement of the tensile strength of steel sheet. However, interfaces of soft ferrite and hard cementite can become starting points of fracture. If pearlite is 15% or more, the interfaces which can become such starting points of fracture become greater, so sometimes deterioration of the hole expandability of steel sheet is invited. For this reason, pearlite is made less than 15% and may also be zero.

If containing two or more of ferrite, bainite, pearlite, and retained austenite, if the total of these structures is 15% or more, sometimes the hole expandability of steel sheet deteriorates, so the total of these structures is made less than 15%.

"As-Quenched Martensite: Less Than 5%"

As-quenched martensite is a structure high in dislocation density and extremely hard and contributes to improvement of the tensile strength of steel sheet. However, as-quenched martensite is extremely hard, so the difference in strength from as-quenched martensite and other structures is large. For this reason, the interfaces of as-quenched martensite and other structures can become starting points of fracture. If such interfaces become greater, sometimes the hole expandability of steel sheet is made to deteriorate. For this reason, as-quenched martensite is made less than 5% and may also be zero.

Surface Soft Part

The metal structures of the surface soft part are mixed structures including at least ferrite and pearlite. More specifically, the metal structures of the surface soft part of the present embodiment are comprised of 65% or more of ferrite, 5% or more and less than 20% of pearlite, a total of less than 10% of one or more of tempered martensite, bainite, and retained austenite, and less than 5% of as-quenched martensite.

"Ferrite: 65% or More"

Ferrite is a soft structure, so easily deforms and contributes to improvement of the bendability of steel sheet. If ferrite is less than 65%, when the steel sheet is bent, sometimes the surface soft part cannot sufficiently deform and the bendability of the steel sheet becomes lower. For this reason, the ferrite at the surface soft part has to be 65% or more. However, as explained later, at the surface soft part, pearlite also has to be present in 5% or more, so the upper limit of ferrite is 95%.

"Pearlite: 5% or More and Less Than 20%"

Pearlite is a hard structure which disperses in ferrite and is comprised of soft ferrite and hard cementite arranged in layers. Further, pearlite is a structure which can raising the bending load of steel sheet. If the pearlite at the surface soft part layer is less than 5%, sometimes the bending load of the steel sheet is not sufficiently raised. On the other hand, if the pearlite at the surface soft part layer is 20% or more, the interfaces of pearlite and soft ferrite become greater. The interfaces can become starting points of crack, so if the interfaces become greater, sometimes deterioration of the bendability of steel sheet is invited. For this reason, pearlite is made 5% or more and less than 20%.

"Tempered Martensite: Less Than 10%"

Tempered martensite is a structure which is high in dislocation density and hard and can raise the bending load of the steel sheet. However, if tempered martensite is 10% or more, the interfaces of hard tempered martensite and soft ferrite become greater. The interfaces can become starting points of crack, so if the interfaces become greater, sometimes deterioration of the bendability of steel sheet is invited. For this reason, tempered martensite is made less than 10% and may also be zero.

"Bainite: Less Than 10%"

Bainite includes high dislocation density lath shaped bainitic ferrite and interfaces of bainitic ferrite or internal carbides and is hard. For this reason, bainite is a structure which can raise the bending load of steel sheet. However, if bainite is 10% or more, the interfaces of bainite and soft ferrite become greater. The interfaces can become starting points of crack, so if the interfaces become greater, sometimes deterioration of the bendability of steel sheet is invited. For this reason, bainite is made less than 10% and may also be zero.

"Retained Austenite: Less Than 10%"

Retained austenite is a structure which contributes to improvement of the ductility of steel sheet by deformation induced transformation effect. On the other hand, retained austenite transforms to as-quenched martensite by deformation induced transformation, so sometimes the bendability of steel sheet can be made to deteriorate. For this reason, retained austenite is made less than 10% and may also be zero.

If containing two or more of tempered martensite, bainite, and retained austenite, if the total of these structures becomes 10% or more, sometimes the bendability of steel sheet deteriorates. For this reason, the total of these structures is preferably made less than 10%.

"As-Quenched Martensite: Less Than 5%"

As-quenched martensite is a structure high in dislocation density and extremely hard and a structure able to raise the bending load of steel sheet. However, as-quenched martensite is extremely hard, so the difference in strength between as-quenched martensite and other structures is large. For this reason, the interfaces of as-quenched martensite and other structures can become starting points of fracture. If such interfaces become greater, sometimes the bendability of steel sheet greatly deteriorates. For this reason, the as-quenched martensite is made less than 5% and may also be zero.

Note that, in the present invention, the metal structures at the center part of sheet thickness are identified and the area ratio is calculated in the following way:

"Ferrite"

First, a sample having a cross-section of sheet thickness parallel to the rolling direction of the steel sheet is taken and that cross-section is made the observed surface. In the observed surface, a 100 μm×100 μm region centered at the position of ¼ of the sheet thickness from the surface of the steel sheet is made the observed region. This observed region is observed by a scanning electron microscope at 1000 to 50000×. The electron channeling contrast image is an image displayed using the difference in crystal orientation of the crystal grains as the difference of contrast. In this electron channeling contrast image, the portions of uniform contrast are ferrite. Further, the area ratio of the ferrite identified in this way is calculated by the point counting method (based on ASTM E562). "Pearlite"

First, the observed surface was corroded by a Nital reagent. In the corroded observed surface, a 100 μm×100 μm region centered at the position of ¼ of the sheet thickness from the surface of the steel sheet is made the observed region. This observed region is observed by an optical microscope at 1000 to 50000× and the regions of a dark contrast in the observed image are deemed pearlite. Further, the area ratio of the pearlite identified in this way was calculated by the point counting method.

"Bainite and Tempered Martensite"

The observed region corroded by the Nital reagent in this way is observed by a field emission scanning electron microscope (FE-SEM) by 1000 to 50000×. In this observed region, the bainite and tempered martensite are identified as follows from the positions of cementite contained inside the structures and the arrangement of the cementite.

As the state of presence of bainite, there are cases where the cementite or retained austenite is present at the lath shaped interfaces of bainitic ferrite and cases where the cementite is present inside of the lath shaped bainitic ferrite. In the case where the cementite or retained austenite is present at the lath shaped interfaces of bainitic ferrite, the bainite can be identified since the interfaces of bainitic ferrite can be understood. Further, if the cementite is present inside of the lath shaped bainitic ferrite, the bainite can be identified since there is a single relationship of crystal orientation of bainitic ferrite and since cementite and since cementite has the same variants. Further, the area ratio of the bainite identified in this way is calculated by the point counting method In tempered martensite, cementite is present inside the martensite laths, but there are two or more types of crystal orientations of martensite laths and cementite and cementite has a plurality of variants, so tempered martensite can be identified. Further, the area ratio of the tempered martensite identified in this way is calculated by the point counting method "As-Quenched Martensite"

First, an observed surface similar to the observed surface used for identification of the ferrite is etched by LePera's solution and a region similar to identification of the ferrite is made the observed region. Martensite and retained austenite are not corroded by corrosion by LePera's solution. For this reason, the observed region corroded by LePera's solution is observed by FE-SEM and the uncorroded regions are deemed martensite and retained austenite. Further, the total area ratio of the martensite and retained austenite identified in this way is calculated by the point counting method. Next, the volume ratio of the retained austenite calculated in the following way is deemed the area ratio of the retained austenite. By subtracting that area ratio from the total area ratio, it is possible to calculate the area ratio of the as-quenched martensite.

"Retained Austenite"

The volume ratio of the retained austenite can be found by X-ray diffraction. First, in the sample taken in the above way, the part down to a position of ¼ of the sheet thickness from the surface is removed by mechanical polishing and chemical polishing to expose a surface of the position of ¼ of sheet thickness from the surface of the steel sheet. Further, the thus exposed surface is irradiated with MoKα rays and the integrated intensity ratio of the diffraction peaks of the (200) plane and (211) plane of the bcc phase and the (200) plane, (220) plane, and (311) plane of the fcc phase is found. From this integrated intensity ratio of the diffraction peaks, it is possible to calculate the volume ratio of the retained austenite. As the method of calculation, it is possible to use the general 5 peak method. The thus found volume ratio of the retained austenite is made the area ratio of the retained austenite.

Further, in the present invention, the metal structures at the surface soft part layer is identified and the area ratio is calculated in the following way.

First, a sample is taken in the same way as the method of identification of the metal structures at the center part of sheet thickness. In the observed surface of that sample, a plurality of observed regions are randomly selected so that there is no bias in the sheet thickness direction in a range defined as the surface soft part layer in the way explained later. The total area of these observed regions is made $2.0 \times 10^{-9}$ m$^2$ or more. The method of identification of the structures other than the retained austenite is similar to the method of identification of the metal structures at the center part of sheet thickness except for the difference in the observed regions.

The volume ratio of the retained austenite of the surface soft part can be found by acquiring information on the crystal orientation of the observed region by the electron backscattering diffraction (EBSD) method.

Specifically, first, a sample having a cross-section of sheet thickness parallel to the rolling direction of the steel sheet is taken. That cross-section is used as the observed surface. The observed surface is successively wet polished by Emery paper, polished by diamond abrasive grains of a 1 µm average grain size, and chemically polished. Further, a plurality of observed regions are randomly selected so that there is no bias in the sheet thickness direction in a range judged the surface soft part by the later explained method in the thus polished observed surface. Crystal orientations of a total of $2.0 \times 10^{-9}$ m$^2$ or more of regions are acquired at 0.05 µm intervals.

At that time, in the present invention, as the software for acquisition of data of the crystal orientation, the software "OIM Data Collection™ (ver. 7)" made by TSL Solutions etc. was used. The information on the crystal orientation acquired was separated into the bcc phase and fcc phase by the software "OIM Analysis™ (ver.7)" made by TSL Solutions. The fcc phase was retained austenite. The volume ratio of the thus found retained austenite was deemed the area ratio of the retained austenite. By subtracting this from the area ratio of the regions judged to be as-quenched martensite or retained austenite in the above way, it is possible to find the area ratio of the as-quenched martensite.

Furthermore, in the high strength steel sheet of the present invention, the thickness of the surface soft part at one side is 10 µm or more and 15% or less of the sheet thickness. Further, the average distance between pearlite and pearlite at the surface soft part is 3 µm or more. Furthermore, at the surface soft part, the ratio Hs/Hc of the Vickers hardness Hc of the center part of sheet thickness and the Vickers hardness Hs of the surface soft part satisfies 0.50≤Hs/Hc≤0.75.

"Thickness of Surface Soft Part: More Than 10 µm and 15% or Less of Sheet Thickness"

The surface soft part has the effect of improving the bendability. If the thickness of the surface soft part is 10 µm or less, the effect of provision of the surface soft part is not obtained much at all. On the other hand, if the thickness of surface soft part is more than 15% of the sheet thickness, sometimes the bending load and tensile strength greatly fall. Therefore, in the high strength steel sheet of the present invention, the thickness of the surface soft part is made 10 µm or more and 15% or less of the sheet thickness. If the two sides of the steel sheet have surface soft parts, the surface soft parts have thicknesses of 10 µm or more and 15% or less of the sheet thickness.

"Average Distance of Pearlite and Pearlite of Surface Soft Part of 3 µm or More"

The interfaces of the hard pearlite and soft ferrite are large in differences in hardness, so the interfaces form starting points of fracture and sometimes invite deterioration of the bendability of steel sheet. However, by the average distance between pearlite and pearlite at the surface soft part being made 3 µm or more, connections between voids formed at the interfaces are suppressed and deterioration of the bendability of steel sheet can be suppressed. The upper limit of the average distance is not particularly set, but the average distance is preferably 50 µm or less from the viewpoint of suppressing the drop in hardness Hs of the surface soft part and the bending load.

It is difficult to directly find the average distance D of pearlite. For this reason, the average distance D of pearlite is found in the following way. That is, the average distance D of pearlite is defined by the following formula (1) using the area ratio $A_p$ of the pearlite ($0 \le A_p \le 1$) and the average length "d" of the pearlite. Here, the average length "d" of the pearlite is found in the following way. First, in the surface soft part defined as explained later, a plurality of observed regions are randomly selected so that there is no bias in the sheet thickness direction. The observed region is made a total of $2.0 \times 10^{-9}$ m$^2$ or more. Next, the value of the total area of the pearlite contained in the observed region divided by the total number of pearlite contained inside the observed region is made the average area of the pearlite. Further, the square root of the average area of the pearlite is made the average length "d" of the pearlite:

[Mathematical 1]

$$D = \frac{1}{2}\sqrt{\frac{\pi d^2}{A_p}} \tag{1}$$

"$0.50 \le Hs/Hc \le 0.75$"

The Vickers hardness Hs of the surface soft part is an important factor for improving the bendability and securing the bending load. If the ratio Hs/Hc of the Vickers hardness Hs of the surface soft part and the Vickers hardness Hc of the center part of sheet thickness is less than 0.50, the bendability is improved, and sometimes a large drop in the bending load is invited. On the other hand, if Hs/Hc is more than 0.75, the bending load is raised, but major improvement of the bendability is difficult to obtain.

Note that, in the present invention, the Vickers hardness Hc of the center part of sheet thickness and the Vickers hardness Hs of the surface soft part are determined by measurement using a Vickers hardness meter by a method based on JIS Z 2244 (2009) by an indentation load of 100 g (0.98N) in the following way.

First, the Vickers hardness was measured at five points at distances of 2% of the sheet thickness from the position of ½ of sheet thickness toward the surface on the line vertical to the sheet thickness direction and parallel to the rolling direction. Further, the average value of the Vickers hardness of the five points of the positions in the sheet thickness direction measured in this way is found and that average value is made the Vickers hardness of the respective positions in the sheet thickness direction. Further, the Vickers hardness at the position of ½ of sheet thickness is made the Vickers hardness Hc at the center part of sheet thickness.

Next, the surface side from the position in the sheet thickness direction where the Vickers hardness becomes 0.9 time or less with respect to the Vickers hardness at the position of ½ of sheet thickness is defined by the "surface soft part". At the surface soft part defined in this way, the Vickers hardnesses at 10 points are measured at random and the average value of the Vickers hardness of these 10 points is made the average Vickers hardness Hs of the surface soft part.

The chemical composition of the steel sheet of the present invention is not particularly limited so long as in the range where the above structures are obtained. Below, an example of the chemical composition preferred for the steel sheet of the present invention will be explained. Below, the "%" relating to the chemical composition means "mass %".

First, the chemical composition of the center part of sheet thickness will be explained.

"C: 0.10% or More, 0.30% or Less"

C is an element securing a predetermined amount of tempered martensite and improving the strength of the steel sheet. To obtain a predetermined amount of tempered martensite and improve the tensile strength to preferably 1180 MPa or more, the content of C is preferably made 0.10% or more. On the other hand, if the content of C is more than 0.30%, carbides are excessively formed and sometimes the hole expandability of steel sheet falls. For this reason, the content of C is preferably 0.30% or less.

"Si: 0.1% or More and 2.5% or Less"

Si is an element acting as a deoxidizer. Further, Si is an element having an effect on the form of the carbides and retained austenite after heat treatment. Si is effective for utilizing the retained austenite to increase the strength of the steel sheet. To suppress the formation of carbides to keep down the deterioration of the formability of steel sheet, the content of Si is preferably 0.1% or more. Note that, keeping down the content of Si to less than 0.1% invites an increase in costs in the current refining process. On the other hand, if the content of Si is more than 2.5%, sometimes embrittlement of the steel sheet is invited and the formability is made to fall, so the content of Si is preferably 2.5% or less.

"Al: 0% or More and 2.500% or Less"

Al is an element acting as a deoxidizer of steel and stabilizing ferrite and is added in accordance with need. To stabilize ferrite by Al, the content of Al is preferably 0.001% or more. On the other hand, if the content of Al is more than 2.500%, coarse Al oxides are formed and sometimes the formability of steel sheet falls. For this reason, the content of Al is preferably 2.50% or less.

"Mn: 0.1% or More and 10.0% or Less"

Mn is an element acting as a deoxidizer. Further, Mn is an element improving the hardenability. To obtain sufficient tempered martensite, the content of Mn is preferably 0.1% or more. On the other hand, if the content of Mn is more than 10.0%, coarse Mn oxides are formed in the steel and form starting points of fracture at the time of press forming thereby sometimes causing deterioration of the formability of the steel sheet. For this reason, the content of Mn is preferably 10.0% or less.

"P: 0.100% or Less"

P is an impurity element and segregates at the center part of sheet thickness of the steel sheet to sometimes cause a drop in the toughness. Further, P is an element causing embrittlement of the weld zone. If the content of P is more than 0.100%, sometimes the weld zone strength and hole expandability remarkably falls, so the content of P is preferably 0.10% or less. The content of P is more preferably 0.010% or less. Note that, the content of P is preferably as small as possible and may also be 0%. However, in actual steel sheet, to reduce the content of P to less than 0.0001%, the manufacturing costs greatly rises and this becomes economically disadvantageous. For this reason, the substantive lower limit of the content of P is 0.0001%.

"S: 0.050% or Less"

S is an impurity element and sometimes causes a drop in the weldability. Further, S sometimes causes a drop in the manufacturability at the time of casting and the time of hot rolling. Furthermore, S forms coarse MnS which sometimes causes the hole expandability of steel sheet to fall. If the content of S is more than 0.050%, the drop in the weldability, the drop in the manufacturability, and the drop in the hole expandability become remarkable, so the content of S is preferably 0.050% or less. The content of S is more preferably 0.010% or less. The content of S is preferably as small as possible and may be 0% as well. However, in actual steel sheet, to reduce the content of S to less than 0.0001%, the manufacturing costs greatly rise and this becomes economically disadvantageous. For this reason, the substantive lower limit of the content of S is 0.0001%.

"N: 0.01000% or Less"

N forms coarse nitrides which sometimes cause the bendability of steel sheet and hole expandability to fall. Further, N is an element able to become a cause of formation of blowholes at the time of welding. If the content of N is more than 0.01000%, the drop in the hole expandability of steel sheet and the formation of blowholes become remarkable, so the content of N is preferably 0.01000% or less. The content of N is preferably as small as possible and may be 0% as well. However, in actual steel sheet, to reduce the content of N to less than 0.00050%, the manufacturing costs greatly rise and this becomes economically disadvantageous. For this reason, the substantive lower limit of the content of N is 0.00050%.

"O: 0.0060% or Less"

O forms coarse oxides which sometimes cause the bendability of steel sheet and hole expandability to fall. Further, O is an element able to become a cause of formation of blowholes at the time of welding. If the content of O is more than 0.0060%, the drop in the hole expandability of steel sheet and the formation of blowholes become remarkable, so the content of O is preferably 0.0060% or less. The content of O is preferably as small as possible and may be 0% as well. However, in actual steel sheet, to reduce the content of O to less than 0.0005%, the manufacturing costs greatly rise and this becomes economically disadvantageous. For this reason, the substantive lower limit of the content of O is 0.0005%.

"Cr: 0% or More and 5.00% or Less"

Cr, like Mn, is an element improving the hardenability and effective for raising the strength of steel sheet and is added according to need. To raise the hardenability by Cr and raise the strength of the steel sheet, the content of Cr is preferably 0.10% or more. On the other hand, if the content of Cr is more than 5.00%, the Cr segregates at the center part of the steel sheet whereby coarse Cr carbides are formed and sometimes cause a drop in the cold formability. For this reason, the content of Cr is preferably 5.00% or less.

"Mo: 0% or More and 1.000% or Less"

Mo, like Mn and Cr, is an element effective for strengthening steel sheet and is added according to need. Mo increases the strength of the steel sheet, so the content of Mo is preferably 0.010% or more. On the other hand, if the content of Mo is more than 1.000%, coarse Mo carbides are formed and the cold formability of the steel sheet sometimes falls. For this reason, the content of Mo is preferably 1.000% or less.

"B: 0% or More and 0.0100% or Less"

B is an element suppressing the formation of ferrite and pearlite in the process of cooling from austenite and promoting formation of bainite or martensite or other microstructure transformed at low temperature. Further, B is an element advantageous for raising the strength of steel sheet and is added in accordance with need. To obtain this effect by B, the content of B is preferably 0.0001% or more. Note that, to identify less than 0.0001% of B, it is necessary to pay careful attention in analysis. Also, depending on the analytical device, sometimes the lower limit of detection is reached. On the other hand, if the content of B is more than 0.0100%, the formation of coarse oxides of B in the steel is invited, these become starting points for formation of voids at the time of press forming, and sometimes the formability of the steel sheet deteriorates. For this reason, the content of B is preferably 0.0100% or less.

"Nb: 0% or More and 0.300% or Less"

Nb is an element effective for controlling shape of carbides and is an element effective also for improvement of the toughness of steel sheet since its addition causes the structures to be made finer. To obtain that effect by Nb, the content of Nb is preferably made 0.001% or more. On the other hand, if the content of Nb is more than 0.300%, a large number of fine, hard Nb carbides precipitate, the strength of the steel sheet rises, the ductility remarkably deteriorates, and sometimes the formability falls. For this reason, the content of Nb is preferably 0.300% or less.

"Ti: 0% or More and 0.300% or Less"

Ti, like Nb, is an element important for controlling shape of the carbides and is an element promoting the increase in strength of the ferrite by inclusion in a large amount. From the viewpoint of formability of the steel sheet, the smaller the content of Ti, the more preferable. It may also be 0%. However, reducing the content of Ti to less than 0.001% invites an increase in refining costs, so the substantive lower limit of the content of Ti is 0.001%. On the other hand, if the content of Ti is more than 0.300%, coarse Ti oxides or TiN is present in the steel and sometimes the formability of the steel sheet is made to decrease. For this reason, the content of Ti is preferably 0.300% or less.

"V: 0% or More and 0.500% or Less"

V, like Ti or Nb, is an element effective for controlling shape of carbides and is an element effective for improvement of the toughness of the steel sheet due to refining the structures due to its addition. To obtain that effect of V, the content of V is preferably 0.001% or more. On the other hand, if the content of V is more than 0.500%, a large number of fine V carbides precipitate, the strength of the steel sheet rises, the ductility remarkably deteriorates, and sometimes the formability falls. For this reason, the content of V is preferably 0.500% or less.

"Ni: 0% or More and 1.00% or Less"

Ni is an element effective for improvement of the strength of steel sheet and is added according to need. To increase the strength by Ni, the content of Ni is preferably 0.01% or more. On the other hand, if the content of Ni is more than 1.00%, sometimes the ductility of the steel sheet falls and a drop in formability is invited. For this reason, the content of Ni is preferably 1.00% or less.

"Cu: 0% or More and 1.000% or Less"

Cu is an element effective for improvement of the strength of steel sheet and is added according to need. To increase the strength by Cu, the content of Cu is preferably 0.001% or more. On the other hand, if the content of Cu is more than 1.000%, sometimes red hot embrittlement is invited and the productivity in hot rolling falls. For this reason, the content of Cu is preferably 1.000% or less.

"Ca: 0% or More and 0.040% or Less"

Ca is an element able to control the form of sulfides by addition in a trace amount and is added according to need. To obtain the effect of control of the form of sulfides by Ca, the content of Ca is preferably 0.001% or more. On the other hand, if the content of Ca is excessive, coarse Ca oxides are formed and become starting points for formation of voids at the time of press forming to sometimes cause the formability to deteriorate. For this reason, the content of Ca preferably is 0.040% or less.

"Mg: 0% or More and 0.040% or Less"

Mg, like Ca, is an element able to control the form of sulfides by addition in a trace amount and is added according to need. To obtain the effect of control of the form of sulfides by Mg, the content of Mg is preferably 0.001% or more. On the other hand, if the content of Mg is excessive, coarse inclusions are formed and sometimes the formability of the steel sheet falls. For this reason, the content of Mg preferably is 0.040% or less.

"REMs: 0% or More and 0.040% or Less"

REMs (rare earth metals), like Ca and Mg, are elements able to control the form of sulfides by addition in trace amounts and are added according to need. As REMs which the high strength steel sheet of the present invention contains, W, Ta, Sn, Sb, As, Zr, Y, La, and Ce may be illustrated. The contents of the REMs may be 0% as well, but to obtain the effect of control of the form of sulfides by REMs, the contents of the REMs are preferably 0.001% or more. On the other hand, if the contents of the REMs are excessive, coarse inclusions are formed and sometimes the formability of the steel sheet falls. For this reason, the contents of REMs are preferably 0.040% or less. REMs are often added as mischmetal, but sometimes are added combined with lanthanoid series elements in addition to La and Ce.

Note that, the balance of the chemical composition of the center part of sheet thickness is Fe and impurities. As impurities, elements unavoidably entering from the raw materials of the steel or the scrap or elements unavoidably entering in the steelmaking process which the high strength steel sheet of the present invention is allowed to contain within a range enabling the effects of the present invention to be manifested may be mentioned.

Next, the chemical composition of the surface soft part will be explained. The ranges of composition of the surface soft part are similar to the center part of sheet thickness, but the content of C at the surface soft part is preferably 0.9 time or less of the content of C at the center part of sheet thickness. Due to the content of C at the surface soft part being 0.9 time or less of the content of C at the center part of sheet thickness, softening of the surface soft part becomes easier than the center part of sheet thickness and the bendability of steel sheet can be easily improved.

Note that, the ranges of composition and other than C at the surface soft part are the same in reasons as well as the ranges of composition of the center part of sheet thickness explained above. In the high strength steel sheet of the present invention, the contents other than C of the surface soft part are substantially no different from the center part of sheet thickness.

Next, one example of the method for manufacturing high strength steel sheet of the present invention will be explained. The high strength steel sheet of the present invention can be manufactured for example as follows:

First, a cast slab having the chemical composition of the high strength steel sheet of the present invention is prepared. After that, that slab is heated to 1100° C. or more directly or after cooling once and supplied for hot rolling. The hot rolling is ended in the $Ar_3$ transformation point or more temperature region and the hot rolled steel sheet after the completion of hot rolling is coiled in the 700° C. or less temperature region. Furthermore, the hot rolled steel sheet is pickled at a 70° C. or more and 100° C. or less temperature for 50 seconds or more and 300 seconds or less.

The hot rolled steel sheet after the pickling is supplied for cold rolling by a reduction rate of 30% or more and 80% or less to obtain cold rolled steel sheet. Below, this "cold rolled steel sheet" will sometimes be called simply "steel sheet". Next, the steel sheet is heated to anneal it in an atmosphere of the logarithm log $P_{O_2}$ of the oxygen partial pressure $P_{O_2}$ (atm) of −26 or more and −22 or less at a "Ac3-30° C." or more and 950° C. or less temperature region. Ac3 is the austenite reverse transformation completion temperature and is found by heating a small piece cut out from the hot rolled steel sheet by 1° C./s up to 1100° C. and measuring the expansion of volume during the same.

After the annealing, the cooling process of the following 1) or 2) is performed.

1) Cooling the steel sheet by a 20° C./s or more average cooling rate to a 25° C. or more and 600° C. or less temperature region, then making the steel sheet dwell at the 100° C. or more and 400° C. or less temperature region for 1000 seconds or less.

2) Cooling the steel sheet by a 0.5° C./s or more and 20° C./s or less average cooling rate to a 600° C. or more and 750° C. or less temperature region (first stage cooling), then cooling the steel sheet by a 20° C./s or more average cooling rate to a 25° C. or more and 600° C. or less temperature region (second stage cooling), then making the steel sheet dwell at a 100° C. or more and 400° C. or less temperature region for 1000 seconds or less.

Below, the conditions of the different processes will be explained in detail.

"Cast Slab"

The cast slab supplied for the hot rolling may be a slab which is cast and is not limited to a specific cast slab. For example, it may be a continuously cast slab or a slab manufactured by a thin slab caster "Heating Temperature of Cast Slab: 1100° C. or More"

If heating a once cooled cast slab then supplying it for hot rolling, the cast slab is heated to 1100° C. or more. The cast slab used for manufacture of the high strength steel sheet of the present invention contains relatively large amounts of alloying elements for making the tensile strength of the high strength steel sheet of the present invention 1180 MPa or more. For this reason, before supplying the casting slab for hot rolling, it is necessary to heat the cast slab to make the alloying elements dissolve in the cast slab. If the heating temperature of the cast slab is less than 1100° C., the alloying elements do not sufficiently dissolve in the cast slab resulting in coarse alloy carbides remaining and brittle cracking occurring during the hot rolling. For this reason, the heating temperature of the cast slab is preferably 1100° C. or more. The upper limit of the heating temperature of the cast slab is not particularly set, but is preferably 1250° C. or less from the viewpoint of the heating capacity of the heating facilities and the productivity.

"Hot Rolling Completion Temperature Region: $Ar_3$ Transformation Point or More"

In this way, the cast slab used for manufacture of the high strength steel sheet of the present invention contains a relatively large amount of alloying elements, so the rolling load has to be increased at the time of hot rolling. For this reason, the hot rolling is preferably completed at a high temperature. The hot rolling completion temperature region is important on the point of control of the metal structures of the steel sheet. If the hot rolling completion temperature region is in the (austenite+ferrite) two-phase temperature region, sometimes the metal structures become greater in nonuniformity and the formability after heat treatment falls. For this reason, the hot rolling completion temperature region is made the $Ar_3$ transformation point or more temperature region. Note that, at the time of hot rolling, rough rolled steel sheets may be joined and continuously hot rolled.

"Hot Rolled Steel Sheet Coiling Temperature Region: 700° C. or Less"

If the coiling temperature of the hot rolled steel sheet is more than 700° C., the metal structures become greater in nonuniformity and the formability after heat treatment easily deteriorates. For this reason, the coiling temperature region is preferably made 700° C. or less. The lower limit of the coiling temperature region is not particularly set, but making the coiling temperature room temperature or less is technically difficult, so room temperature is the substantive lower limit of the coiling temperature.

Pickling: 70° C. or More in Temperature for 50 Seconds or More and 300 Seconds or Less The hot rolled steel sheet coiled up in the above way is pickled at a 70° C. or more temperature for 50 seconds or more and 300 seconds or less time. In this pickling process, the oxides of the surface of the hot rolled steel sheet are removed and the chemical conversion coating ability and plateability of the cold rolled steel sheet are improved. Furthermore, by controlling the pickling conditions, it is possible to control the surface roughness of the hot rolled steel sheet and possible to efficiently introduce shear strain to the surface layer in the later cold rolling.

According to the above-mentioned pickling conditions, the pick count (PPc) of the surface of the steel sheet before cooling by pickling becomes 60 (/mm) or more and the shear strain of the surface layer introduced by the cold rolling can be controlled. The pick count (PPc) is measured using a stylus profiler based on JIS B 0601 (2013). Under usual pickling conditions, the average distance between pearlite and pearlite cannot be sufficiently increased, but depending on the pickling method, the average distance between pearlite and pearlite of the surface soft part can be controlled in the later annealing.

The solution used for the pickling may be the solution used for normal pickling. For example, 5 vol % or more hydrochloric acid or sulfuric acid may be mentioned. Further, the pickling may be performed at one time or divided into several times according to need. When performing the pickling at one time, the "pickling time" means the time of that pickling, while when performing the pickling several times, it means the total time of these pickling operations.

By making the pickling temperature 70° C. or more, the oxides of the surface layer can be sufficiently removed. The upper limit of the pickling temperature is not particularly set, but realistically is about 95° C. Further, by making the pickling time 50 seconds or more, the surface roughness is increased and the introduction of shear strain into the surface layer by the cold rolling becomes easy. The lower limit of the pickling time is preferably 100 seconds. On the other hand, if the pickling time is more than 300 seconds, the surface roughness becomes excessively coarse and the surface roughness deteriorates. Furthermore, the relief shapes remaining after cold rolling give rise to notch like effects and sometimes cause the bendability to deteriorate. The upper limit of the pickling time is preferably 200 seconds.

"Reduction Rate of Cold Rolling: 30% or More and 80% or Less"

The thus pickled hot rolled steel sheet is supplied for cold rolling by a rolling reduction of 30% or more and 80% or less to obtain cold rolled steel sheet. By making the rolling reduction of the cold rolling 30% or more, the shape of the cold rolled steel sheet can be kept flat and the final product can be kept from falling in ductility. The rolling reduction of the cold rolling is preferably 50% or more. On the other hand, by making the rolling reduction of the cold rolling 80% or less, it is possible to keep the rolling load from becoming excessive and the rolling from becoming difficult. The rolling reduction of the cold rolling is preferably 70% or less. The number of rolling passes and the rolling reduction for each pass are not particularly limited. The rolling reduction of the cold rolling may be suitably set to become the above range.

"Logarithm log $P_{O_2}$ of Oxygen Partial Pressure $P_{O_2}$ of Atmosphere: -26 or More and -22 or Less"

"Annealing Temperature Region: 'Ac3-30° C.' or More and 950° C. or Less"

In the heating furnace and soaking furnace of the continuous annealing line, the logarithm log $P_{O_2}$ of the oxygen partial pressure $P_{O_2}$ in the furnace atmosphere is maintained at -26 or more and -22 or less and the steel sheet is heated to the "Ac3-30° C." or more and 950° C. or less temperature region to anneal the steel sheet.

In the annealing in the heating furnace and soaking furnace, decarburization of the surface of the steel sheet proceeds and the amount of carbon of the surface layer falls in the "Ac3-30° C." or more temperature region. Due to the amount of carbon at the surface layer and the hardenability of the surface layer falling, suitable amounts of ferrite and pearlite can be obtained at the surface layer. To promote such decarburization, the oxygen partial pressure $P_{O_2}$ of the furnace atmosphere is limited to a suitable range.

If the logarithm log $P_{O_2}$ of the oxygen partial pressure $P_{O_2}$ of the atmosphere is -26 or more, the oxygen potential becomes sufficiently higher, the decarburization proceeds, the state of external oxidation of the Si or Mn is suppressed, and good plating adhesion can be secured. log $P_{O_2}$ is preferably -25 or more. On the other hand, if log $P_{O_2}$ is -22 or less, excessive decarburization due to the oxygen potential becoming too high is suppressed, not only the Si and Mn, but also the base metal steel sheet itself ending up being oxidized is suppressed, and the desired surface condition becomes easier to obtain.

By making the annealing temperature region the "Ac3-30° C." or more, during the annealing, austenite is formed and a predetermined amount of tempered martensite becomes easier to obtain as final structures. For this reason, the steel sheet can more easily satisfy the desired tensile strength. On the other hand, if the annealing temperature region is made more than 950° C., while there is no problem in the properties of the steel sheet, the productivity falls. For this reason, the annealing temperature region is preferably 950° C. or less, more preferably 900° C. or less.

Cooling Process of 1)

"Average Cooling Rate: 20° C./s or more"

"Cooling Stop Temperature: 25° C. or More and 450° C. or Less"

After annealing, the steel sheet is cooled by a 20° C./s or more average cooling rate down to a 25° C. or more and 450° C. or less temperature region. This cooling is important on the point of obtaining as-quenched martensite forming the source of the predetermined amount of tempered martensite.

As-quenched martensite is formed at a 25° C. or more and 450° C. or less temperature region by transformation from nuclei of fine amounts of dislocations present in pretransformation austenite. By making the average cooling rate from the annealing temperature until reaching the 25° C. or more and 450° C. or less temperature region 20° C./s or more, the dislocations contained in the pretransformation austenite grains are kept from ending up being used up. The average cooling rate in this cooling process is preferably 35° C./s or more.

By making the cooling stop temperature 25° C. or more, it is possible to keep the productivity from falling. The cooling stop temperature is preferably 100° C. or more. On the other hand, by making the cooling stop temperature 450° C. or less, the formation of bainite, ferrite, and pearlite is kept from progressing and a predetermined amount of martensite can be secured. The cooling stop temperature is preferably 400° C. or less.

"Dwelling in 100° C. or More and 400° C. or Less Temperature Region for 1000 Seconds or Less"

The thus cooled steel sheet includes as-quenched martensite. By making this steel sheet dwell at 100° C. or more and 400° C. or less, it is possible to make the as-quenched martensite change to tempered martensite and improve the formability of the steel sheet. In this process, by making the dwell temperature 100° C. or more, the effect by tempering becomes easier to obtain. On the other hand, by making the dwell temperature 400° C. or less, it is possible to keep excessive tempering from proceeding and possible to keep the strength of the steel sheet from dropping. Further, by making the dwell time 1000 seconds or less, it is possible to keep the productivity from dropping.

For the purpose of promoting formation of ferrite and pearlite at the surface soft part, the steel sheet after annealing may be cooled by the cooling process of 2) instead of the cooling process of 1). That is, the steel sheet may be cooled by a 0.5° C./s or more and 20° C./s or less average cooling rate to the 600° C. or more and 750° C. or less temperature region (first stage cooling), then the steel sheet may be cooled by a 20° C./s or more average cooling rate to the 25° C. or more and 600° C. or less temperature region (second stage cooling).

"First Stage Cooling"

"Average Cooling Rate: 0.5° C./s or More and 20° C./s or Less"

"Cooling Stop Temperature: 600° C. or More and 750° C. or Less"

By making the average cooling rate in the first stage cooling 20° C./s or less, it is possible to promote the formation of ferrite and pearlite at the surface soft part. However, if the first stage average cooling rate is more than 20° C./s, the result just becomes the same as the case of performing the cooling process of the above 1). The material quality of the steel sheet does not deteriorate. The upper limit of the average cooling rate at the first stage cooling is the upper limit for obtaining the effect in the case of performing cooling in two stages. On the other hand, by making the average cooling rate at the first stage cooling 0.5° C./s or more, excessive ferrite transformation and pearlite transformation is suppressed not only at the surface soft part but also the center part of sheet thickness and a predetermined amount of martensite becomes easier to obtain. The average cooling rate at the first stage cooling is preferably 10° C./s or more.

By making the cooling stop temperature at the first stage cooling 600° C. or more, it is possible to keep structures other than ferrite and pearlite from being formed at the surface soft part and bendability of steel sheets from falling. The cooling stop temperature of the first stage cooling is preferably 620° C. or more. On the other hand, by making the cooling stop temperature of the first stage cooling 750° C. or less, formation of ferrite and pearlite at the surface soft part can be promoted. However, if the cooling stop temperature of the first stage cooling is more than 750° C., the result just becomes the same as the case of performing the cooling process of the above 1). The material quality of the steel sheet does not deteriorate. The upper limit of the cooling stop temperature at the first stage cooling is the upper limit for obtaining the effect in the case of performing cooling in two stages.

"Second Stage Cooling"

"Average Cooling Rate: 20° C./s or More"

"Cooling Stop Temperature: 25° C. or More, 600° C. or Less"

The average cooling rate and cooling stop temperature of the second stage cooling are similar to the average cooling rate and cooling stop temperature in the cooling process of 1). However, due to the first stage cooling, formation of ferrite and pearlite of the surface soft part is promoted, so steel sheet excellent in bendability can be obtained.

"Tempering"

Further, the steel sheet may also be tempered. The tempering may be performed by reheating during the process of the final cooling to room temperature or may be performed after the end of final cooling. The method of tempering is not particularly limited. For example, the steel sheet may be caused to dwell at a 200° C. or more and 500° C. or less in temperature region for 2 seconds or more. Due to the tempering, the as-quenched martensite becomes tempered martensite and the bendability or hole expandability of the steel sheet can be improved. "Plating and Surface Treatment"

Further, the steel sheet may be electroplated, vapor deposition plated, or otherwise plated and further may be alloyed after being plated. Further, the steel sheet may be formed with an organic coating or a film laminate, treated by an organic salt or inorganic salt, nonchrome treated, or otherwise surface treated.

As the plating, if hot dip galvanizing the steel sheet, for example, the steel sheet is heated to or cooled to a temperature of 40° C. or lower than the temperature of the galvanization bath or more and a temperature of 50° C. higher than the temperature of the galvanization bath or less and that steel sheet run through the galvanization bath. Due to such hot dip galvanization, a steel sheet provided with a hot dip galvanized layer at its surface, that is, a hot dip galvanized steel sheet, is obtained. The hot dip galvanized layer has a chemical composition of for example Fe: 7 mass % or more and 15 mass % or less and a balance of Zn, Al, and impurities. Further, the hot dip galvanized layer may also be a zinc alloy.

If performing alloying treatment after hot dip galvanization treatment, for example, the hot dip galvanized steel sheet is heated to a 460° C. or more and 600° C. or less temperature. If the temperature is less than 460° C., the alloying is insufficient. On the other hand, if this temperature is more than 600° C., the alloying becomes excessive and the corrosion resistance sometimes deteriorates. Due to such alloying treatment, steel sheet provided with a hot dip galvannealed layer on its surface, that is, hot dip galvannealed steel sheet, is obtained.

Using the methods illustrated above, it is possible to manufacture high strength steel sheets according to embodiments of the present invention. Note that, the embodiments only show specific illustrations for working the present invention. The technical scope of the present invention must not be interpreted in a limited manner by these. That is, the present invention can be worked in various ways without departing from its technical idea or main features.

EXAMPLES

Below, examples will be used to show specific examples of the present invention. However, the present invention of course is not limited by the following examples.

Cast slabs having the chemical compositions of Tables 1-1 and 1-2 were heated to the slab heating temperatures described in Tables 2-1 to 2-3 and supplied for hot rolling and coiled under the conditions described in Tables 2-1 to 2-3. The obtained hot rolled steel sheets were pickled and supplied for cold rolling under the conditions described in Tables 2-1 to 2-3.

Next, the obtained cold rolled steel sheets were annealed under conditions described in Tables 2-1 to 2-3. Some of the steel sheets were hot dip galvanized by an ordinary method. Furthermore, some of the coated steel sheets were alloyed by an ordinary method.

The constituents of the cast slabs, manufacturing conditions, and structures of the obtained steel sheets were identified in this way to find the area ratios. The results were shown in Tables 3-1 to 3-3.

Further, each of the obtained steel sheets was calculated or measured for the ratio of the content of C of the surface soft part and the content of C of the center part of sheet thickness, the average distance (μm) between pearlite and pearlite of the surface soft part, the sheet thickness (mm), the thickness (mm) of the surface soft part per side, the position of the surface soft part (one side or both sides), the ratio (%) of the thickness of the surface soft part per side with respect to the sheet thickness, the Vickers hardness Hc (Hv) of the center part of sheet thickness, the Vickers hardness Hs (Hv) of the surface soft part, Hs/Hc, the total elongation El (%), the hole expansion rate λ (%), the limit bending angle α (°), and the maximum load F (N) at the time of a bending test (bending load). These results are shown in Tables 4-1 to 4-3. The Vickers hardness was measured as explained above. The total elongation was measured by the tensile test method shown in JIS Z 2241 (2011). The hole expansion value λ was measured by the hole expansion test method shown in JIS Z 2256 (2010). The limit bending angle α and the bending load F were measured by a bending test based on VDA (Verband der Automobilindustrie) 238-100.

In the examples, ones satisfying $0.50 \leq Hs/Hc \leq 0.75$ $Hc \times El \geq 4000$ $Hc \times \lambda \geq 7000$ $\alpha \geq 7.3t^2 - 37.2t + 100$ $F \geq 3500t^2 + 2600t + 0.04Hc^2 - 7.6Hc - 6000$ were judged as good. The threshold values of α, F are values obtained by experience.

TABLE 1

Table 1-1

| Constituent | C | Si | Mn | S | P | Al | N | O | Cr | Mo |
|---|---|---|---|---|---|---|---|---|---|---|
| A | 0.10 | 0.5 | 2.0 | 0.0020 | 0.030 | 0.030 | 0.00060 | 0.0030 | | |
| B | 0.15 | 1.8 | 2.1 | 0.0400 | 0.010 | 0.030 | 0.00060 | 0.0023 | | |
| C | 0.25 | 1.5 | 3.0 | 0.0300 | 0.030 | 0.030 | 0.00060 | 0.0028 | | |
| D | 0.22 | 0.4 | 3.1 | 0.0010 | 0.020 | 0.030 | 0.00060 | 0.0024 | | |
| E | 0.12 | 0.8 | 3.1 | 0.0010 | 0.040 | 0.030 | 0.00060 | 0.0045 | | |
| F | 0.15 | 2.2 | 2.0 | 0.0010 | 0.020 | 0.030 | 0.00060 | 0.0044 | | |
| G | 0.17 | 2.5 | 2.0 | 0.0010 | 0.010 | 0.030 | 0.00060 | 0.0029 | | |
| H | 0.16 | 1.5 | 1.6 | 0.0020 | 0.060 | 0.030 | 0.00060 | 0.0031 | | |
| I | 0.13 | 1.4 | 3.8 | 0.0100 | 0.030 | 0.030 | 0.00060 | 0.0024 | | |
| J | 0.26 | 1.8 | 6.8 | 0.0200 | 0.010 | 0.030 | 0.00060 | 0.0055 | | |
| K | 0.15 | 1.7 | 8.9 | 0.0300 | 0.010 | 0.030 | 0.00060 | 0.0052 | | |
| L | 0.15 | 2.4 | 3.7 | 0.0500 | 0.030 | 0.030 | 0.00060 | 0.0023 | 0.50 | |
| M | 0.12 | 2.3 | 4.0 | 0.0400 | 0.010 | 0.030 | 0.00060 | 0.0012 | 0.30 | |
| N | 0.11 | 2.1 | 3.4 | 0.0100 | 0.010 | 0.030 | 0.00060 | 0.0028 | | 0.050 |
| O | 0.27 | 2.1 | 3.0 | 0.0300 | 0.010 | 0.030 | 0.00060 | 0.0049 | | 0.200 |
| P | 0.19 | 1.7 | 3.4 | 0.0100 | 0.010 | 0.030 | 0.00060 | 0.0020 | | |
| Q | 0.14 | 2.0 | 3.9 | 0.0200 | 0.010 | 0.030 | 0.00060 | 0.0013 | | |
| R | 0.12 | 2.4 | 2.0 | 0.0100 | 0.020 | 0.030 | 0.00060 | 0.0049 | 0.30 | |
| S | 0.16 | 2.5 | 2.8 | 0.0100 | 0.010 | 0.030 | 0.00060 | 0.0028 | | 0.050 |
| T | 0.21 | 1.6 | 3.2 | 0.0200 | 0.010 | 0.030 | 0.00060 | 0.0042 | | |
| U | 0.16 | 1.6 | 3.9 | 0.0200 | 0.010 | 0.030 | 0.00060 | 0.0057 | 0.20 | 0.100 |
| V | 0.02 | 1.2 | 2.4 | 0.0010 | 0.020 | 0.020 | 0.00080 | 0.0043 | | |
| W | 0.40 | 1.2 | 2.0 | 0.0010 | 0.020 | 0.020 | 0.00060 | 0.0038 | | |
| X | 0.25 | 2.8 | 2.6 | 0.0010 | 0.020 | 0.020 | 0.00070 | 0.0019 | | |
| Y | 0.25 | 1.2 | 10.5 | 0.0010 | 0.020 | 0.020 | 0.00060 | 0.0031 | | |
| Z | 0.25 | 1.2 | 2.1 | 0.0600 | 0.020 | 0.020 | 0.00060 | 0.0029 | | |

| Constituent | B | Ti | Nb | V | Cu | Ni | Ca | Mg | REMs |
|---|---|---|---|---|---|---|---|---|---|
| A | | | | | | | | | |
| B | | | | | | | | | |
| C | | | | | | | | | |
| D | | | | | | 0.050 | | | |
| E | 0.0015 | 0.020 | | | | | | | |
| F | | | | | | | | | |
| G | | | | | | | | | |
| H | | | | | | | | 0.020 | |
| I | | | | | | | | | |
| J | | | | | | | 0.020 | | |
| K | | | | | | | | | |
| L | | | | | | | | | 0.010 |
| M | | | | | | | | | |
| N | | | | | | | | | |
| O | | | | | | | | | |
| P | 0.0020 | | | | | 0.30 | | | |
| Q | | 0.030 | | | 0.100 | | | | |
| R | | | 0.030 | | | 0.200 | 0.10 | | |
| S | | 0.020 | | | 0.020 | | | | |
| T | | | | | 0.060 | | | | |
| U | 0.0020 | 0.020 | 0.020 | | | | | 0.020 | |
| V | | | | | | | | | |
| W | | | | | | | | | |
| X | | | | | | | | | |
| Y | | | | | | | | | |
| Z | | | | | | | | | |

TABLE 1-2

| Constituent | C | Si | Mn | S | P | Al | N | O | Cr | Mo | B | Ti | Nb | V | Cu | Ni | Ca | Mg | REMs |
|---|---|---|---|---|---|---|---|---|---|---|---|---|---|---|---|---|---|---|---|
| AA | 0.25 | 1.2 | 2.7 | 0.0010 | 0.130 | 0.020 | 0.00060 | 0.0052 | | | | | | | | | | | |
| AB | 0.25 | 1.2 | 3.2 | 0.0010 | 0.020 | 2.800 | 0.00060 | 0.0011 | | | | | | | | | | | |

TABLE 1-2-continued

| Constituent | C | Si | Mn | S | P | Al | N | O | Cr | Mo | B | Ti | Nb | V | Cu | Ni | Ca | Mg | REMs |
|---|---|---|---|---|---|---|---|---|---|---|---|---|---|---|---|---|---|---|---|
| AC | 0.25 | 1.2 | 3.4 | 0.0010 | 0.020 | 0.020 | 0.15000 | 0.0020 | | | | | | | | | | | |
| AD | 0.25 | 1.2 | 1.6 | 0.0010 | 0.020 | 0.020 | 0.00060 | 0.0038 | 5.50 | | | | | | | | | | |
| AE | 0.25 | 1.2 | 1.8 | 0.0010 | 0.020 | 0.020 | 0.00060 | 0.0054 | | 1.500 | | | | | | | | | |
| AF | 0.25 | 1.2 | 3.2 | 0.0010 | 0.020 | 0.020 | 0.00050 | 0.0046 | | | 0.0200 | | | | | | | | |
| AG | 0.25 | 1.2 | 3.1 | 0.0010 | 0.020 | 0.020 | 0.00060 | 0.0018 | | | | 0.350 | | | | | | | |
| AH | 0.25 | 1.2 | 2.5 | 0.0010 | 0.020 | 0.020 | 0.00040 | 0.0041 | | | | | 0.350 | | | | | | |
| AI | 0.25 | 1.2 | 2.8 | 0.0010 | 0.020 | 0.020 | 0.00040 | 0.0013 | | | | | | 0.550 | | | | | |
| AJ | 0.25 | 1.2 | 2.7 | 0.0010 | 0.020 | 0.020 | 0.00060 | 0.0016 | | | | | | | 1.500 | | | | |
| AK | 0.25 | 1.2 | 3.0 | 0.0010 | 0.020 | 0.020 | 0.00050 | 0.0019 | | | | | | | | 1.50 | | — | |
| AL | 0.25 | 1.2 | 2.9 | 0.0010 | 0.020 | 0.020 | 0.00050 | 0.0048 | | | | | | | | | | — | 1.500 |
| AM | 0.25 | 1.8 | 2.3 | 0.0400 | 0.010 | 0.030 | 0.00060 | 0.0012 | | 0.500 | 0.0020 | | | | | | | | |
| AN | 0.18 | 1.3 | 2.5 | 0.0010 | 0.010 | 0.040 | 0.00070 | 0.0030 | | | | | 0.020 | | | | | | |
| AO | 0.22 | 1.5 | 3.0 | 0.0020 | 0.010 | 0.040 | 0.00050 | 0.0019 | | | 0.0015 | 0.020 | | | | | | | |
| AP | 0.22 | 1.5 | 3.0 | 0.0400 | 0.010 | 0.030 | 0.00060 | 0.0068 | | | | | | | | | | | |
| AQ | 0.22 | 1.5 | 3.0 | 0.0010 | 0.020 | 0.020 | 0.00080 | 0.0041 | | | | | | | | | 0.052 | — | |
| AR | 0.22 | 1.5 | 3.0 | 0.0200 | 0.010 | 0.030 | 0.00060 | 0.0035 | | | | | | | | | — | 0.063 | |

TABLE 2-1

| | Hot rolling | | | | Pickling | | Cold rolling | Oxygen partial | | Annealing process | | |
|---|---|---|---|---|---|---|---|---|---|---|---|---|
| | | | | | | | | | | | First stage cooling | |
| Man. cond. | Slab heating temp. [° C.] | Finish end temp. [° C.] | Coiling temp. [° C.] | Ar3 [° C.] | Pickling temp. [° C.] | Pickling time [s] | Cooling rate [%] | pressure [atm] logarithm | Ac3−30 [° C.] | Heating temp. [° C.] | First stage cooling | First stage cooling rate [° C./s] |
| 1 | 1120 | 845 | 640 | 754 | 80 | 250 | 33 | −22 | 790 | 900 | None | None |
| 2 | 1220 | 878 | 660 | 741 | 80 | 250 | 45 | −22 | 831 | 900 | None | None |
| 3 | 1160 | 830 | 510 | 630 | 80 | 250 | 66 | −22 | 768 | 900 | None | None |
| 4 | 1238 | 900 | 420 | 629 | 80 | 250 | 62 | −22 | 721 | 900 | None | None |
| 5 | 1245 | 854 | 250 | 655 | 80 | 250 | 65 | −22 | 764 | 900 | None | None |
| 6 | 1152 | 860 | 400 | 759 | 80 | 250 | 72 | −22 | 852 | 900 | None | None |
| 7 | 1242 | 843 | 650 | 760 | 80 | 250 | 34 | −22 | 860 | 920 | None | None |
| 8 | 1116 | 886 | 680 | 770 | 75 | 250 | 43 | −22 | 830 | 900 | None | None |
| 9 | 1123 | 835 | 490 | 601 | 90 | 250 | 35 | −22 | 767 | 900 | None | None |
| 10 | 1112 | 893 | 490 | 374 | 80 | 55 | 35 | −22 | 665 | 900 | None | None |
| 11 | 1201 | 872 | 580 | 194 | 80 | 120 | 62 | −22 | 622 | 900 | None | None |
| 12 | 1233 | 862 | 620 | 628 | 80 | 280 | 76 | −22 | 804 | 930 | None | None |
| 13 | 1236 | 887 | 360 | 610 | 80 | 250 | 35 | −22 | 801 | 920 | None | None |
| 14 | 1214 | 887 | 500 | 656 | 80 | 250 | 75 | −22 | 818 | 935 | None | None |
| 15 | 1116 | 896 | 640 | 676 | 80 | 250 | 60 | −26 | 797 | 915 | None | None |
| 16 | 1252 | 862 | 390 | 622 | 80 | 250 | 45 | −24 | 773 | 900 | None | None |
| 17 | 1248 | 822 | 470 | 605 | 80 | 250 | 31 | −22 | 774 | 900 | None | None |
| 18 | 1203 | 882 | 530 | 773 | 80 | 250 | 48 | −22 | 860 | 916 | None | None |
| 19 | 1121 | 855 | 540 | 699 | 80 | 250 | 79 | −22 | 834 | 930 | None | None |
| 20 | 1126 | 869 | 450 | 651 | 80 | 250 | 50 | −22 | 781 | 940 | None | None |
| 21 | 1212 | 892 | 320 | 588 | 80 | 250 | 65 | −22 | 758 | 880 | Yes | 0.6 |
| 22 | 1150 | 850 | 500 | 718 | 80 | 250 | 65 | −22 | 818 | 920 | Yes | 5 |
| 23 | 1150 | 850 | 500 | 718 | 80 | 250 | 65 | −22 | 818 | 920 | Yes | 15 |
| 24 | 1150 | 850 | 500 | 718 | 80 | 250 | 65 | −22 | 818 | 920 | Yes | 5 |
| 25 | 1150 | 850 | 500 | 718 | 80 | 250 | 65 | −22 | 818 | 920 | Yes | 5 |
| 26 | 1150 | 850 | 500 | 718 | 80 | 250 | 65 | −22 | 818 | 920 | Yes | 5 |
| 27 | 1150 | 850 | 500 | 718 | 80 | 250 | 65 | −22 | 818 | 920 | None | None |
| 28 | 1150 | 850 | 500 | 687 | 80 | 250 | 65 | −22 | 793 | 920 | None | None |

TABLE 2-1-continued

| | Annealing process | | | | | | | | | |
|---|---|---|---|---|---|---|---|---|---|---|
| | First stage cooling | Second stage cooling | | | | | | | | |
| Man. cond. | First stage cooling stop temp. [° C.] | Second stage cooling rate [° C./s] | Second stage cooling stop temp. [° C.] | Dwell temp. [° C.] | Dwell time [s] | Plating | Alloying | Tempering of post process | Tempering temp. [° C.] | Tempering time [s] |
| 1 | None | 35 | 220 | 290 | 430 | None | None | None | None | None |
| 2 | None | 30 | 200 | 320 | 10 | None | None | Yes | 350 | 500 |
| 3 | None | 42 | 160 | 230 | 620 | None | None | None | None | None |
| 4 | None | 25 | 350 | 400 | 300 | None | None | None | None | None |
| 5 | None | 38 | 210 | 370 | 300 | None | None | None | None | None |
| 6 | None | 36 | 400 | 400 | 30 | None | None | Yes | 350 | 300 |
| 7 | None | 40 | 190 | 250 | 900 | None | None | None | None | None |
| 8 | None | 45 | 240 | 330 | 700 | None | None | None | None | None |
| 9 | None | 29 | 200 | 300 | 50 | None | None | Yes | 300 | 50 |
| 10 | None | 35 | 178 | 230 | 100 | Yes | None | Yes | 250 | 100 |
| 11 | None | 34 | 417 | 300 | 180 | Yes | Yes | None | None | None |
| 12 | None | 25 | 180 | 290 | 100 | None | None | None | None | None |
| 13 | None | 22 | 428 | 350 | 160 | None | None | Yes | 300 | 150 |
| 14 | None | 25 | 196 | 250 | 200 | Yes | Yes | None | None | None |
| 15 | None | 26 | 226 | 340 | 300 | None | None | None | None | None |
| 16 | None | 30 | 310 | 230 | 30 | None | None | Yes | 350 | 300 |
| 17 | None | 20 | 300 | 350 | 230 | None | None | None | None | None |
| 18 | None | 50 | 280 | 280 | 180 | None | None | None | None | None |
| 19 | None | 80 | 191 | 310 | 380 | None | None | None | None | None |
| 20 | None | 100 | 289 | 350 | 100 | None | None | None | None | None |
| 21 | 650 | 25 | 100 | 130 | 260 | None | None | Yes | 200 | 800 |
| 22 | 650 | 35 | 250 | 280 | 550 | Yes | Yes | None | None | None |
| 23 | 650 | 35 | 250 | 110 | 900 | None | None | None | None | None |
| 24 | 600 | 20 | 250 | 370 | 830 | None | None | None | None | None |
| 25 | 700 | 50 | 250 | 260 | 840 | None | None | None | None | None |
| 26 | 730 | 100 | 250 | 200 | 150 | None | None | None | None | None |
| 27 | None | 35 | 50 | 200 | 400 | Yes | Yes | None | None | None |
| 28 | None | 35 | 150 | 330 | 350 | None | None | None | None | None |

TABLE 2-2

| | Hot rolling | | | | Pickling | | Cold rolling | Oxygen partial | | | Annealing process | |
|---|---|---|---|---|---|---|---|---|---|---|---|---|
| | | | | | | | | | | | First stage cooling | |
| Man. cond. | Slab heating temp. [° C.] | Finish end temp. [° C.] | Coiling temp. [° C.] | Ar3 [° C.] | Pickling temp. [° C.] | Pickling time [s] | Cooling rate [%] | pressure [atm] logarithm | Ac3-30 [° C.] | Heating temp. [° C.] | First stage cooling | First stage cooling rate [° C./s] |
| 29 | 1150 | 850 | 500 | 687 | 80 | 250 | 65 | −22 | 793 | 920 | None | None |
| 30 | 1150 | 850 | 500 | 687 | 80 | 250 | 65 | −22 | 793 | 920 | None | None |
| 31 | 1150 | 850 | 500 | 687 | 80 | 250 | 65 | −22 | 793 | 920 | None | None |
| 32 | 1150 | 850 | 500 | 687 | 80 | 250 | 65 | −22 | 793 | 920 | None | None |
| 33 | 1150 | 850 | 500 | 687 | 80 | 250 | 65 | −22 | 793 | 920 | None | None |
| 34 | 1150 | 850 | 500 | 639 | 80 | 250 | 65 | −22 | 770 | 920 | None | None |
| 35 | 1150 | 850 | 500 | 639 | 80 | 250 | 65 | −22 | 770 | 920 | None | None |
| 36 | 1150 | 850 | 500 | 639 | 80 | 250 | 65 | −22 | 770 | 920 | None | None |
| 37 | 1150 | 850 | 500 | 639 | 80 | 250 | 65 | −22 | 770 | 920 | None | None |
| 38 | 1150 | 850 | 500 | 639 | 80 | 250 | 65 | −22 | 770 | 920 | None | None |
| 39 | 1241 | 882 | 541 | 694 | 80 | 250 | 59 | −22 | 841 | 930 | None | None |
| 40 | 1232 | 878 | 624 | 576 | 80 | 250 | 63 | −22 | 753 | 843 | None | None |
| 41 | 1226 | 889 | 567 | 663 | 80 | 250 | 49 | −22 | 834 | 925 | None | None |
| 42 | 1217 | 882 | 568 | 23 | 80 | 250 | 57 | −22 | 525 | 834 | None | None |
| 43 | 1189 | 893 | 589 | 623 | 80 | 250 | 47 | −26 | 777 | 859 | None | None |
| 44 | 1228 | 878 | 557 | 623 | 80 | 250 | 53 | −24 | 759 | 836 | None | None |
| 45 | 1229 | 897 | 565 | 628 | 80 | 250 | 58 | −22 | 815 | 850 | None | None |
| 46 | 1244 | 879 | 541 | 623 | 80 | 250 | 62 | −22 | 738 | 849 | None | None |
| 47 | 1205 | 877 | 594 | 623 | 80 | 250 | 63 | −22 | 732 | 840 | None | None |

TABLE 2-2-continued

| 48 | 1190 | 889 | 543 | 623 | 80 | 250 | 49 | −22 | 833 | 900 | None | None |
|---|---|---|---|---|---|---|---|---|---|---|---|---|
| 49 | 1213 | 890 | 619 | 623 | 80 | 250 | 62 | −22 | 744 | 860 | None | None |
| 50 | 1214 | 888 | 613 | 623 | 80 | 250 | 61 | −22 | 607 | 841 | None | None |
| 51 | 1233 | 893 | 582 | 623 | 80 | 250 | 59 | −22 | 765 | 840 | None | None |
| 52 | 1223 | 877 | 630 | 623 | 80 | 250 | 47 | −22 | 813 | 870 | None | None |
| 53 | 1204 | 885 | 558 | 623 | 80 | 250 | 46 | −22 | 729 | 834 | None | None |
| 54 | 1242 | 873 | 558 | 623 | 80 | 250 | 63 | −22 | 727 | 827 | None | None |
| 55 | 1221 | 889 | 540 | 620 | 80 | 250 | 8 | −22 | 753 | 830 | None | None |
| 56 | <u>1000</u> | 850 | 500 | 718 | 80 | 250 | 45 | −22 | 818 | 900 | None | None |

| | Annealing process | | | | | | | | | |
|---|---|---|---|---|---|---|---|---|---|---|
| | First stage cooling | Second stage cooling | | | | | | | | |
| Man. cond. | First stage cooling stop temp. [° C.] | Second stage cooling rate [° C./s] | Second stage cooling stop temp. [° C.] | Dwell temp. [° C.] | Dwell time [s] | Plating | Alloying | Tempering of post process | Tempering temp. [° C.] | Tempering time [s] |
| 29 | None | 35 | 300 | 300 | 140 | None | None | None | None | None |
| 30 | None | 35 | 400 | 200 | 150 | None | None | None | None | None |
| 31 | None | 35 | 180 | 200 | 300 | None | None | None | None | None |
| 32 | None | 35 | 180 | 300 | 870 | None | None | None | None | None |
| 33 | None | 35 | 180 | 400 | 720 | None | None | None | None | None |
| 34 | None | 35 | 50 | 200 | 870 | None | None | None | None | None |
| 35 | None | 35 | 50 | 350 | 420 | None | None | None | None | None |
| 36 | None | 35 | 50 | 400 | 120 | None | None | None | None | None |
| 37 | None | 35 | 50 | 350 | 100 | Yes | None | None | None | None |
| 38 | None | 35 | 50 | 350 | 900 | Yes | Yes | None | None | None |
| 39 | None | <u>19</u> | 447 | 250 | 770 | None | None | None | None | None |
| 40 | None | <u>18</u> | 80 | 300 | 400 | None | None | None | None | None |
| 41 | None | 30 | 100 | 300 | 300 | None | None | None | None | None |
| 42 | None | 29 | 243 | 150 | 180 | None | None | None | None | None |
| 43 | None | 24 | 50 | 300 | 240 | None | None | None | None | None |
| 44 | None | 30 | 50 | 300 | 240 | None | None | None | None | None |
| 45 | None | 27 | 50 | 390 | 50 | None | None | None | None | None |
| 46 | None | <u>19</u> | 120 | 380 | 450 | None | None | None | None | None |
| 47 | None | <u>19</u> | 120 | 380 | 450 | None | None | None | None | None |
| 48 | None | 32 | 150 | 350 | 200 | None | None | None | None | None |
| 49 | None | <u>19</u> | 120 | 380 | 450 | None | None | None | None | None |
| 50 | None | 30 | 100 | 250 | 700 | None | None | None | None | None |
| 51 | None | 32 | 100 | 300 | 180 | None | None | None | None | None |
| 52 | None | 25 | 100 | 390 | 200 | None | None | None | None | None |
| 53 | None | 28 | 150 | 300 | 250 | None | None | None | None | None |
| 54 | None | 27 | 150 | 300 | 840 | None | None | None | None | None |
| 55 | None | 27 | 150 | 300 | 840 | None | None | None | None | None |
| 56 | None | 30 | 180 | 300 | 200 | None | None | None | None | None |

TABLE 2-3

| | Hot rolling | | | | Pickling | | Cold rolling | Oxygen partial | | | Annealing process | |
|---|---|---|---|---|---|---|---|---|---|---|---|---|
| | Slab | Finish | | | | | | | | | | First stage cooling |
| Man. cond. | heating temp. [° C.] | end temp. [° C.] | Coiling temp. [° C.] | Ar3 [° C.] | Pickling temp. [° C.] | Pickling time [s] | Cooling rate [%] | pressure [atm] logarithm | Ac3-30 [° C.] | Heating temp. [° C.] | First stage cooling | First stage cooling rate [° C./s] |
| 57 | 1150 | 700 | 560 | 718 | 80 | 250 | 45 | −22 | 818 | 900 | None | None |
| 58 | 1150 | 850 | 750 | 718 | 80 | 250 | 45 | −22 | 818 | 900 | None | None |
| 59 | 1150 | 850 | 560 | 718 | <u>60</u> | 250 | 65 | −22 | 818 | 900 | None | None |
| 60 | 1150 | 850 | 560 | 718 | 80 | <u>20</u> | 45 | −22 | 818 | 900 | None | None |
| 61 | 1150 | 850 | 560 | 718 | 80 | 400 | 50 | −22 | 818 | 900 | None | None |
| 62 | 1150 | 850 | 560 | 718 | 80 | 250 | 5 | −22 | 818 | 900 | None | None |
| 63 | 1150 | 850 | 560 | 718 | 80 | 250 | <u>95</u> | −22 | 818 | 900 | None | None |
| 64 | 1150 | 850 | 560 | 718 | 80 | 250 | 45 | <u>−27</u> | 818 | 900 | None | None |
| 65 | 1150 | 850 | 560 | 718 | 80 | 250 | 45 | <u>−21</u> | 818 | 900 | None | None |

TABLE 2-3-continued

| | | | | | | | | | | | | |
|---|---|---|---|---|---|---|---|---|---|---|---|---|
| 66 | 1150 | 850 | 560 | 718 | 80 | 250 | 45 | −22 | 818 | 800 | None | None |
| 67 | 1150 | 850 | 560 | 718 | 80 | 250 | 45 | −22 | 818 | 970 | None | None |
| 68 | 1150 | 850 | 560 | 718 | 80 | 250 | 45 | −22 | 818 | 900 | Yes | 0.1 |
| 69 | 1150 | 850 | 560 | 718 | 80 | 250 | 45 | −22 | 818 | 900 | Yes | 65 |
| 70 | 1150 | 850 | 560 | 718 | 80 | 250 | 45 | −22 | 818 | 900 | Yes | 5 |
| 71 | 1150 | 850 | 560 | 718 | 80 | 250 | 45 | −22 | 818 | 900 | Yes | 5 |
| 72 | 1150 | 850 | 560 | 718 | 80 | 250 | 45 | −22 | 818 | 900 | None | None |
| 73 | 1150 | 850 | 560 | 718 | 80 | 250 | 45 | −22 | 818 | 900 | None | None |
| 74 | 1150 | 850 | 560 | 718 | 80 | 250 | 45 | −22 | 818 | 900 | None | None |
| 75 | 1150 | 850 | 560 | 718 | 80 | 250 | 45 | −27 | 818 | 900 | None | 2 |
| 76 | 1150 | 850 | 560 | 718 | 80 | 250 | 45 | −22 | 818 | 900 | None | None |
| 77 | 1150 | 850 | 560 | 718 | 80 | 250 | 45 | −22 | 818 | 900 | None | None |
| 78 | 1150 | 850 | 560 | 718 | 80 | 250 | 45 | −22 | 818 | 900 | None | None |
| 79 | 1150 | 850 | 560 | 718 | 80 | 250 | 45 | −22 | 818 | 900 | None | None |
| 80 | 1150 | 850 | 560 | 718 | 80 | 250 | 45 | −22 | 818 | 900 | None | None |
| 81 | 1150 | 850 | 560 | 718 | 80 | 250 | 45 | −22 | 818 | 900 | None | None |
| 82 | 1150 | 890 | 550 | 687 | 85 | 200 | 65 | −23 | 793 | 880 | None | None |
| 83 | 1230 | 900 | 500 | 639 | 75 | 150 | 70 | −24 | 770 | 920 | None | None |
| 84 | 1230 | 900 | 500 | 639 | 75 | 150 | 70 | −24 | 774 | 920 | None | None |
| 85 | 1230 | 900 | 500 | 639 | 75 | 150 | 70 | −24 | 770 | 920 | None | None |
| 86 | 1230 | 900 | 500 | 639 | 75 | 150 | 70 | −24 | 774 | 920 | None | None |

| | Annealing process | | | | | | | | | |
|---|---|---|---|---|---|---|---|---|---|---|
| | First stage cooling | Second stage cooling | | | | | | | | |
| Man. cond. | First stage cooling stop temp. [° C.] | Second stage cooling rate [° C./s] | Second stage cooling stop temp. [° C.] | Dwell temp. [° C.] | Dwell time [s] | Plating | Alloying | Tempering of post process | Tempering temp. [° C.] | Tempering time [s] |
| 57 | None | 30 | 180 | 300 | 200 | None | None | None | None | None |
| 58 | None | 30 | 180 | 300 | 200 | None | None | None | None | None |
| 59 | None | 30 | 180 | 300 | 200 | None | None | None | None | None |
| 60 | None | 30 | 180 | 300 | 200 | None | None | None | None | None |
| 61 | None | 30 | 180 | 300 | 200 | None | None | None | None | None |
| 62 | None | 30 | 180 | 300 | 200 | None | None | None | None | None |
| 63 | None | 30 | 180 | 300 | 200 | None | None | None | None | None |
| 64 | None | 30 | 180 | 300 | 200 | None | None | None | None | None |
| 65 | None | 30 | 180 | 300 | 200 | None | None | None | None | None |
| 66 | None | 30 | 180 | 300 | 200 | None | None | None | None | None |
| 67 | None | 30 | 180 | 300 | 200 | None | None | None | None | None |
| 68 | 650 | 30 | 180 | 300 | 200 | None | None | None | None | None |
| 69 | 650 | 30 | 180 | 300 | 200 | None | None | None | None | None |
| 70 | 550 | 30 | 180 | 300 | 200 | None | None | None | None | None |
| 71 | 800 | 30 | 180 | 300 | 200 | None | None | None | None | None |
| 72 | None | 5 | 180 | 300 | 200 | None | None | None | None | None |
| 73 | None | 10 | 180 | 300 | 200 | None | None | None | None | None |
| 74 | None | 30 | 650 | 400 | 180 | None | None | None | None | None |
| 75 | 680 | 30 | 120 | 200 | 300 | None | None | None | None | None |
| 76 | None | 30 | 700 | 200 | 720 | None | None | None | None | None |
| 77 | None | 30 | 180 | 30 | 930 | None | None | None | None | None |
| 78 | None | 30 | 180 | 500 | 200 | None | None | None | None | None |
| 79 | None | 30 | 180 | 370 | 1100 | None | None | None | None | None |
| 80 | None | 30 | 180 | 180 | 650 | None | None | None | None | None |
| 81 | None | 30 | 180 | 300 | 800 | None | None | None | None | None |
| 82 | None | 40 | 180 | 350 | 150 | None | None | None | None | None |
| 83 | None | 50 | 180 | 320 | 300 | Yes | Yes | None | None | None |
| 84 | None | 50 | 180 | 320 | 300 | Yes | Yes | None | None | None |
| 85 | None | 50 | 180 | 320 | 300 | Yes | Yes | None | None | None |
| 86 | None | 50 | 180 | 320 | 300 | Yes | Yes | None | None | None |

TABLE 3-1

| | | | Area ratio of microstructure of center part of sheet thickness (%) | | | | | | Area ratio of microstructure of surface soft part (%) | | | | | | |
|---|---|---|---|---|---|---|---|---|---|---|---|---|---|---|---|---|
| Steel sheet | Const. | Man. cond. | Tempered martensite | Bainite | Retained austenite | Pearlite | Ferrite | Total (B + γ + P + F) | As-quenched martensite | Tempered martensite | Bannte | Retained austenite | Total (fM + B + γ) | Pearlite | Ferrite | As-quenched martensite |
| 1 | A | 1 | 90 | 5 | 3 | 0 | 0 | 8 | 2 | 7 | 0 | 0 | 7 | 18 | 75 | 0 |
| 2 | B | 2 | 98 | 1 | 1 | 0 | 0 | 2 | 0 | 7 | 0 | 0 | 7 | 18 | 75 | 0 |
| 3 | C | 3 | 94 | 3 | 1 | 0 | 0 | 4 | 2 | 7 | 0 | 0 | 7 | 18 | 75 | 0 |
| 4 | D | 4 | 86 | 4 | 7 | 0 | 0 | 11 | 3 | 7 | 0 | 0 | 7 | 18 | 75 | 0 |
| 5 | E | 5 | 89 | 5 | 5 | 0 | 0 | 10 | 1 | 7 | 0 | 0 | 7 | 18 | 75 | 0 |
| 6 | F | 6 | 94 | 2 | 1 | 2 | 1 | 6 | 0 | 7 | 0 | 0 | 7 | 18 | 75 | 0 |
| 7 | G | 7 | 91 | 3 | 2 | 1 | 0 | 6 | 3 | 7 | 0 | 0 | 7 | 18 | 75 | 0 |
| 8 | H | 8 | 87 | 8 | 4 | 0 | 0 | 12 | 1 | 7 | 0 | 0 | 7 | 18 | 75 | 0 |
| 9 | I | 9 | 98 | 0 | 1 | 0 | 0 | 1 | 1 | 7 | 0 | 0 | 7 | 18 | 75 | 0 |
| 10 | J | 10 | 93 | 4 | 2 | 0 | 0 | 6 | 1 | 7 | 0 | 0 | 7 | 18 | 75 | 0 |
| 11 | K | 11 | 86 | 6 | 8 | 0 | 0 | 14 | 0 | 7 | 0 | 0 | 7 | 18 | 75 | 0 |
| 12 | L | 12 | 87 | 7 | 3 | 0 | 0 | 10 | 3 | 7 | 0 | 0 | 7 | 18 | 75 | 0 |
| 13 | M | 13 | 89 | 5 | 6 | 0 | 0 | 11 | 0 | 7 | 0 | 0 | 7 | 18 | 75 | 0 |
| 14 | N | 14 | 93 | 5 | 1 | 1 | 0 | 7 | 0 | 7 | 0 | 0 | 7 | 18 | 75 | 0 |
| 15 | O | 15 | 86 | 9 | 2 | 0 | 0 | 11 | 3 | 9 | 0 | 0 | 9 | 15 | 72 | 4 |
| 16 | P | 16 | 98 | 0 | 2 | 0 | 0 | 2 | 0 | 8 | 0 | 0 | 8 | 16 | 73 | 3 |
| 17 | Q | 17 | 88 | 8 | 4 | 0 | 0 | 12 | 0 | 8 | 0 | 0 | 8 | 15 | 77 | 0 |
| 18 | R | 18 | 90 | 8 | 2 | 0 | 0 | 10 | 0 | 7 | 0 | 0 | 7 | 18 | 75 | 0 |
| 19 | S | 19 | 88 | 7 | 5 | 0 | 0 | 12 | 0 | 7 | 0 | 0 | 7 | 18 | 75 | 0 |
| 20 | T | 20 | 90 | 4 | 5 | 0 | 0 | 9 | 1 | 7 | 0 | 0 | 7 | 18 | 75 | 0 |
| 21 | U | 21 | 90 | 0 | 0 | 2 | 8 | 10 | 0 | 7 | 0 | 0 | 7 | 18 | 75 | 0 |
| 22 | AM | 22 | 94 | 0 | 0 | 0 | 6 | 6 | 0 | 7 | 0 | 0 | 7 | 18 | 75 | 0 |
| 23 | AM | 23 | 93 | 0 | 0 | 2 | 5 | 7 | 0 | 7 | 0 | 0 | 7 | 18 | 75 | 0 |
| 24 | AM | 24 | 94 | 0 | 0 | 2 | 4 | 6 | 0 | 7 | 0 | 0 | 7 | 18 | 75 | 0 |
| 25 | AM | 25 | 95 | 0 | 0 | 2 | 3 | 5 | 0 | 7 | 0 | 0 | 7 | 18 | 75 | 0 |
| 26 | AM | 26 | 93 | 0 | 0 | 4 | 3 | 7 | 0 | 7 | 0 | 0 | 7 | 18 | 75 | 0 |
| 27 | AM | 27 | 100 | 0 | 0 | 0 | 0 | 0 | 0 | 7 | 0 | 0 | 7 | 18 | 75 | 0 |
| 28 | AN | 28 | 91 | 6 | 3 | 0 | 0 | 9 | 0 | 7 | 0 | 0 | 7 | 18 | 75 | 0 |

TABLE 3-2

| | | | Area ratio of microstructure of center part of sheet thickness (%) | | | | | | | Area ratio of microstructure of surface soft part (%) | | | | | | |
|---|---|---|---|---|---|---|---|---|---|---|---|---|---|---|---|---|
| Steel sheet | Const. | Man. cond. | Tempered martensite | Bainite | Retained austenite | Pearlite | Ferrite | Total (B + γ + P + F) | As-quenched martensite | Tempered martensite | Bannte | Retained austenite | Total (fM + B + γ) | Pearlite | Ferrite | As-quenched martensite |
| 29 | AN | 29 | 88 | 9 | 3 | 0 | 0 | 12 | 0 | 7 | 0 | 0 | 7 | 18 | 75 | 0 |
| 30 | AN | 30 | 94 | 4 | 0 | 0 | 0 | 4 | 2 | 7 | 0 | 0 | 7 | 18 | 75 | 0 |
| 31 | AN | 31 | 88 | 6 | 2 | 0 | 0 | 8 | 4 | 7 | 0 | 0 | 7 | 18 | 75 | 0 |
| 32 | AN | 32 | 88 | 6 | 5 | 0 | 0 | 11 | 1 | 7 | 0 | 0 | 7 | 18 | 75 | 0 |
| 33 | AN | 33 | 88 | 7 | 5 | 0 | 0 | 12 | 0 | 7 | 0 | 0 | 7 | 18 | 75 | 0 |
| 34 | AO | 34 | 100 | 0 | 0 | 0 | 0 | 0 | 0 | 7 | 0 | 0 | 7 | 18 | 75 | 0 |
| 35 | AO | 35 | 100 | 0 | 0 | 0 | 0 | 0 | 0 | 7 | 0 | 0 | 7 | 18 | 75 | 0 |
| 36 | AO | 36 | 100 | 0 | 0 | 0 | 0 | 0 | 0 | 7 | 0 | 0 | 7 | 18 | 75 | 0 |
| 37 | AO | 37 | 100 | 0 | 0 | 0 | 0 | 0 | 0 | 7 | 0 | 0 | 7 | 18 | 75 | 0 |
| 38 | AO | 38 | 100 | 0 | 0 | 0 | 0 | 0 | 0 | 7 | 0 | 0 | 7 | 18 | 75 | 0 |
| 39 | V | 39 | 10 | 30 | 0 | 20 | 40 | 90 | 0 | 7 | 0 | 0 | 7 | 18 | 75 | 0 |
| 40 | W | 40 | 90 | 6 | 4 | 0 | 0 | 10 | 0 | 7 | 0 | 0 | 7 | 18 | 75 | 0 |
| 41 | X | 41 | 93 | 4 | 3 | 0 | 0 | 7 | 0 | 7 | 0 | 0 | 7 | 18 | 75 | 0 |
| 42 | Y | 42 | 0 | 40 | 60 | 0 | 0 | 100 | 0 | 7 | 0 | 0 | 7 | 18 | 75 | 0 |
| 43 | Z | 43 | 100 | 0 | 0 | 0 | 0 | 0 | 0 | 7 | 0 | 0 | 7 | 18 | 75 | 0 |
| 44 | AA | 44 | 100 | 0 | 0 | 0 | 0 | 0 | 0 | 7 | 0 | 0 | 7 | 18 | 75 | 0 |
| 45 | AB | 45 | 96 | 2 | 2 | 0 | 0 | 4 | 0 | 7 | 0 | 0 | 7 | 18 | 75 | 0 |
| 46 | AC | 46 | 91 | 6 | 3 | 0 | 0 | 9 | 0 | 7 | 0 | 0 | 7 | 18 | 75 | 0 |
| 47 | AD | 47 | Trouble at time of manufacture, sample unable to be obtained. | | | | | | | | | | | | | |
| 48 | AE | 48 | 87 | 8 | 3 | 0 | 0 | 11 | 2 | 7 | 0 | 0 | 7 | 18 | 75 | 0 |
| 49 | AF | 49 | Trouble at time of manufacture, sample unable to be obtained. | | | | | | | | | | | | | |
| 50 | AG | 50 | 93 | 7 | 0 | 0 | 0 | 7 | 0 | 7 | 0 | 0 | 7 | 18 | 75 | 0 |
| 51 | AH | 51 | 93 | 5 | 2 | 0 | 0 | 7 | 0 | 7 | 0 | 0 | 7 | 18 | 75 | 0 |
| 52 | AI | 52 | 94 | 4 | 2 | 0 | 0 | 6 | 0 | 7 | 0 | 0 | 7 | 18 | 75 | 0 |
| 53 | AJ | 53 | 94 | 4 | 2 | 0 | 0 | 6 | 0 | 7 | 0 | 0 | 7 | 18 | 75 | 0 |
| 54 | AK | 54 | 94 | 5 | 1 | 0 | 0 | 6 | 0 | 7 | 0 | 0 | 7 | 18 | 75 | 0 |
| 55 | AL | 55 | 94 | 5 | 1 | 0 | 0 | 6 | 0 | 7 | 0 | 0 | 7 | 18 | 75 | 0 |
| 56 | AM | 56 | Trouble at time of manufacture, sample unable to be obtained. | | | | | | | | | | | | | |
| 57 | AM | 57 | Trouble at time of manufacture, sample unable to be obtained. | | | | | | | | | | | | | |

TABLE 3-3

| Steel sheet | Const. | Man. cond. | Area ratio of microstructure of center part of sheet thickness (%) ||||||| Area ratio of microstructure of surface soft part (%) |||||||
|---|---|---|---|---|---|---|---|---|---|---|---|---|---|---|---|---|
| | | | Tempered martensite | Bainite | Retained austenite | Pearlite | Ferrite | Total (B + γ + P + F) | As-quenched martensite | Tempered martensite | Bainite | Retained austenite | Total (fM + B + γ) | Pearlite | Ferrite | As-quenched martensite |
| 58 | AM | 58 | 88 | 8 | 2 | 2 | 0 | 12 | 0 | 7 | 0 | 0 | 7 | 18 | 75 | 0 |
| 59 | AM | 59 | 88 | 8 | 2 | 2 | 0 | 12 | 0 | 7 | 0 | 0 | 7 | 18 | 75 | 0 |
| 60 | AM | 60 | 88 | 8 | 2 | 2 | 0 | 12 | 0 | 7 | 0 | 0 | 7 | 18 | 75 | 0 |
| 61 | AM | 61 | 88 | 8 | 2 | 2 | 0 | 12 | 0 | 7 | 0 | 0 | 7 | 18 | 75 | 0 |
| 62 | AM | 62 | Trouble at time of manufacture, sample unable to be obtained. |||||||||||||||
| 63 | AM | 63 | Trouble at time of manufacture, sample unable to be obtained. |||||||||||||||
| 64 | AM | 64 | 88 | 8 | 2 | 2 | 0 | 12 | 0 | 5 | 0 | 0 | 5 | 25 | 70 | 0 |
| 65 | AM | 65 | 88 | 8 | 2 | 2 | 0 | 12 | 0 | 0 | 0 | 0 | 0 | 2 | 93 | 5 |
| 66 | AM | 66 | 0 | 8 | 2 | 2 | 88 | 100 | 0 | 0 | 0 | 0 | 0 | 40 | 60 | 0 |
| 67 | AM | 67 | 88 | 8 | 2 | 2 | 0 | 12 | 0 | 7 | 0 | 0 | 7 | 18 | 75 | 0 |
| 68 | AM | 68 | 60 | 6 | 3 | 13 | 18 | 40 | 0 | 7 | 0 | 0 | 7 | 18 | 75 | 0 |
| 69 | AM | 69 | 80 | 16 | 2 | 2 | 0 | 20 | 0 | 7 | 0 | 0 | 7 | 18 | 75 | 0 |
| 70 | AM | 70 | 88 | 8 | 2 | 2 | 0 | 12 | 0 | 7 | 20 | 0 | 27 | 18 | 55 | 0 |
| 71 | AM | 71 | 88 | 8 | 2 | 2 | 0 | 12 | 0 | 7 | 0 | 0 | 7 | 18 | 75 | 0 |
| 72 | AM | 72 | 60 | 30 | 3 | 4 | 3 | 40 | 0 | 7 | 0 | 0 | 7 | 18 | 75 | 0 |
| 73 | AM | 73 | 66 | 25 | 3 | 3 | 3 | 34 | 0 | 7 | 0 | 0 | 7 | 18 | 75 | 0 |
| 74 | AM | 74 | 50 | 40 | 0 | 10 | 0 | 50 | 0 | 7 | 0 | 0 | 7 | 18 | 75 | 0 |
| 75 | AM | 75 | 95 | 3 | 0 | 0 | 2 | 5 | 0 | 2 | 0 | 0 | 2 | 12 | 86 | 0 |
| 76 | AM | 76 | 50 | 0 | 0 | 30 | 20 | 50 | 0 | 7 | 0 | 0 | 7 | 18 | 75 | 0 |
| 77 | AM | 77 | 25 | 0 | 0 | 0 | 0 | 0 | 75 | 7 | 0 | 0 | 7 | 18 | 75 | 0 |
| 78 | AM | 78 | 100 | 0 | 0 | 0 | 0 | 0 | 0 | 7 | 0 | 0 | 7 | 18 | 75 | 0 |
| 79 | AM | 79 | 90 | 8 | 2 | 0 | 0 | 10 | 0 | 7 | 0 | 0 | 7 | 18 | 75 | 0 |
| 80 | AM | 80 | 88 | 6 | 3 | 0 | 0 | 9 | 3 | 7 | 0 | 0 | 7 | 18 | 75 | 0 |
| 81 | AM | 81 | 87 | 8 | 3 | 0 | 0 | 11 | 2 | 7 | 0 | 0 | 7 | 18 | 75 | 0 |
| 82 | AN | 82 | 90 | 8 | 2 | 0 | 0 | 10 | 0 | 8 | 0 | 0 | 8 | 19 | 70 | 3 |
| 83 | AO | 83 | 85 | 9 | 3 | 0 | 0 | 12 | 3 | 9 | 0 | 0 | 9 | 15 | 75 | 1 |
| 84 | AP | 84 | 85 | 9 | 3 | 0 | 0 | 12 | 3 | 9 | 0 | 0 | 9 | 15 | 75 | 1 |
| 85 | AQ | 85 | 85 | 9 | 3 | 0 | 0 | 12 | 3 | 9 | 0 | 0 | 9 | 15 | 75 | 1 |
| 86 | AR | 86 | 85 | 9 | 3 | 0 | 0 | 12 | 3 | 9 | 0 | 0 | 9 | 15 | 75 | 1 |

TABLE 4-1

| Steel Sheet | Amount of C of surface soft part/ Amount of C at center part of sheet thickness | Pealite distance at soft part of surface layer (μm) | Sheet thickness (total thickness) (mm) | Sheet thickness (soft part of surface layer) (mm) | Position of soft part of surface layer | Thickness of surface layer per side/total thickness (%) | Average Vickers hardness of center part of sheet thickness Hc (Hv) | Average Vickers hardness of soft part of surface layer Hs (Hv) | Hs/Hc | Total elongation El (%) |
|---|---|---|---|---|---|---|---|---|---|---|
| 1 | 0.65 | 5.6 | 1.5 | 0.11 | Two sides | 7.0 | 361 | 230 | 0.64 | 13.1 |
| 2 | 0.65 | 7.7 | 1.1 | 0.11 | Two sides | 9.5 | 371 | 229 | 0.62 | 12.8 |
| 3 | 0.65 | 7.2 | 2 | 0.13 | Two sides | 6.5 | 412 | 229 | 0.56 | 11.2 |
| 4 | 0.65 | 8.4 | 2 | 0.08 | Two sides | 4.0 | 369 | 229 | 0.62 | 12.9 |
| 5 | 0.65 | 7.0 | 1 | 0.11 | Two sides | 11.4 | 351 | 229 | 0.65 | 13.5 |
| 6 | 0.65 | 7.4 | 1.7 | 0.12 | Two sides | 6.9 | 359 | 229 | 0.64 | 13.3 |
| 7 | 0.65 | 8.7 | 1.5 | 0.11 | Two sides | 7.6 | 365 | 229 | 0.63 | 13.0 |
| 8 | 0.65 | 6.7 | 2 | 0.11 | Two sides | 5.4 | 354 | 229 | 0.65 | 13.4 |
| 9 | 0.65 | 9.6 | 1.6 | 0.10 | Two sides | 5.9 | 370 | 229 | 0.62 | 12.8 |
| 10 | 0.65 | 4.7 | 2 | 0.12 | Two sides | 5.9 | 414 | 229 | 0.55 | 11.1 |
| 11 | 0.65 | 6.9 | 1 | 0.12 | One side | 12.1 | 340 | 229 | 0.67 | 14.0 |
| 12 | 0.65 | 6.2 | 1 | 0.10 | Two sides | 9.8 | 357 | 229 | 0.64 | 13.3 |
| 13 | 0.65 | 6.1 | 1.1 | 0.10 | Two sides | 9.4 | 347 | 229 | 0.66 | 13.7 |
| 14 | 0.65 | 5.5 | 2 | 0.13 | Two sides | 6.5 | 363 | 230 | 0.63 | 13.1 |
| 15 | 0.8 | 5.9 | 1 | 0.04 | Two sides | 4.1 | 417 | 253 | 0.61 | 11.1 |
| 16 | 0.7 | 4.3 | 1 | 0.05 | Two sides | 5.0 | 379 | 244 | 0.64 | 12.5 |
| 17 | 0.6 | 5.4 | 1.1 | 0.11 | One side | 10.1 | 352 | 221 | 0.63 | 13.5 |
| 18 | 0.65 | 7.7 | 1.6 | 0.12 | Two sides | 7.3 | 359 | 229 | 0.64 | 13.2 |
| 19 | 0.65 | 4.7 | 1.7 | 0.09 | Two sides | 5.3 | 352 | 229 | 0.65 | 13.5 |
| 20 | 0.65 | 9.5 | 1.7 | 0.09 | Two sides | 5.0 | 372 | 229 | 0.62 | 12.8 |
| 21 | 0.65 | 7.0 | 1.9 | 0.12 | Two sides | 6.1 | 340 | 229 | 0.67 | 14.0 |
| 22 | 0.65 | 6.7 | 2 | 0.12 | Two sides | 6.0 | 394 | 229 | 0.58 | 11.9 |
| 23 | 0.65 | 8.7 | 1.7 | 0.10 | Two sides | 5.7 | 390 | 229 | 0.59 | 12.1 |
| 24 | 0.65 | 6.4 | 1.1 | 0.08 | Two sides | 7.5 | 394 | 229 | 0.58 | 11.9 |
| 25 | 0.65 | 8.0 | 1.6 | 0.10 | Two sides | 6.4 | 399 | 229 | 0.57 | 11.7 |
| 26 | 0.65 | 7.1 | 1.6 | 0.08 | Two sides | 5.1 | 390 | 229 | 0.59 | 12.1 |

TABLE 4-1-continued

| | | | | | | | | | |
|---|---|---|---|---|---|---|---|---|---|
| 27 | 0.65 | 8.1 | 1.2 | 0.09 | Two sides | 7.2 | 420 | 229 | 0.55 | 10.9 |
| 28 | 0.65 | 6.7 | 2 | 0.09 | Two sides | 4.5 | 401 | 229 | 0.57 | 11.6 |

| Steel Sheet | Hole expandability $\lambda$ (%) | Bending angle $\alpha$ (°) | Bending load F(N) | Hc × El | Hc × $\lambda$ | Formula of bending angle (°) | Formula of bending load (N) | Remarks |
|---|---|---|---|---|---|---|---|---|
| 1 | 30.8 | 76.2 | 12252 | 4752 | 11131 | 60.6 | 8253 | Ex. |
| 2 | 34.2 | 84.7 | 6686 | 4743 | 12686 | 67.9 | 3779 | Ex. |
| 3 | 32.4 | 88.5 | 24776 | 4625 | 13364 | 54.8 | 16870 | Ex. |
| 4 | 29.1 | 59.0 | 22466 | 4746 | 10734 | 54.8 | 15839 | Ex. |
| 5 | 29.5 | 93.7 | 5211 | 4754 | 10351 | 70.1 | 2358 | Ex. |
| 6 | 32.9 | 83.4 | 15623 | 4753 | 11800 | 57.9 | 10955 | Ex. |
| 7 | 30.2 | 83.4 | 12353 | 4749 | 11038 | 60.6 | 8341 | Ex. |
| 8 | 29.4 | 72.9 | 21495 | 4754 | 10418 | 54.8 | 15530 | Ex. |
| 9 | 34.1 | 67.5 | 14332 | 4744 | 12634 | 59.2 | 9795 | Ex. |
| 10 | 32.1 | 80.3 | 24941 | 4617 | 13296 | 54.8 | 16915 | Ex. |
| 11 | 30.1 | 99.1 | 5044 | 4746 | 10223 | 70.1 | 2133 | Ex. |
| 12 | 28.5 | 82.0 | 5331 | 4754 | 10186 | 70.1 | 2493 | Ex. |
| 13 | 29.6 | 83.0 | 6288 | 4752 | 10275 | 67.9 | 3277 | Ex. |
| 14 | 30.3 | 88.2 | 21932 | 4751 | 11007 | 54.8 | 15718 | Ex. |
| 15 | 28.1 | 76.0 | 6336 | 4607 | 11704 | 70.1 | 3874 | Ex. |
| 16 | 32.2 | 79.0 | 5754 | 4731 | 12200 | 70.1 | 2963 | Ex. |
| 17 | 29.3 | 90.0 | 6331 | 4754 | 10302 | 67.9 | 3368 | Ex. |
| 18 | 31.0 | 83.0 | 13842 | 4753 | 11133 | 59.2 | 9550 | Ex. |
| 19 | 28.5 | 62.5 | 15419 | 4754 | 10020 | 57.9 | 10807 | Ex. |
| 20 | 29.9 | 58.8 | 16295 | 4742 | 11119 | 57.9 | 11240 | Ex. |
| 21 | 29.6 | 79.7 | 18583 | 4746 | 10055 | 55.7 | 13609 | Ex. |
| 22 | 32.2 | 81.1 | 23787 | 4692 | 12702 | 54.8 | 16427 | Ex. |
| 23 | 28.9 | 67.7 | 17027 | 4705 | 11279 | 57.9 | 11662 | Ex. |
| 24 | 33.2 | 68.3 | 7146 | 4692 | 13097 | 67.9 | 4322 | Ex. |
| 25 | 33.5 | 72.8 | 15351 | 4679 | 13356 | 59.2 | 10448 | Ex. |
| 26 | 30.9 | 59.9 | 15120 | 4705 | 12060 | 59.2 | 10247 | Ex. |
| 27 | 35.0 | 68.2 | 3039 | 4591 | 14688 | 65.9 | 6015 | Ex. |
| 28 | 29.4 | 59.4 | 24325 | 4671 | 11792 | 54.8 | 61589 | Ex. |

TABLE 4-2

| Steel Sheet | Amount of C of surface soft part/ Amount of C at center part of sheet thickness | Pealite distance at soft part of surface layer (μm) | Sheet thickness (total thickness) (mm) | Sheet thickness (soft part of surface layer) (mm) | Position of soft part of surface layer | Thickness of surface layer per side/total thickness (%) | Average Vickers hardness of center part of sheet thickness Hc (Hv) | Average Vickers hardness of soft part of surface layer Hs (Hv) | Hs/Hc | Total elongation El (%) |
|---|---|---|---|---|---|---|---|---|---|---|
| 29 | 0.65 | 5.9 | 1 | 0.13 | Two sides | 12.8 | 398 | 229 | 0.58 | 11.8 |
| 30 | 0.65 | 6.9 | 1 | 0.09 | Two sides | 8.5 | 416 | 229 | 0.55 | 11.1 |
| 31 | 0.65 | 4.3 | 1.6 | 0.11 | Two sides | 6.6 | 405 | 229 | 0.56 | 11.5 |
| 32 | 0.65 | 5.1 | 1.6 | 0.12 | Two sides | 7.7 | 393 | 229 | 0.58 | 12.0 |
| 33 | 0.65 | 8.7 | 1.4 | 0.12 | Two sides | 8.5 | 392 | 229 | 0.58 | 12.0 |
| 34 | 0.65 | 8.6 | 1.8 | 0.09 | Two sides | 4.9 | 420 | 229 | 0.55 | 10.9 |
| 35 | 0.65 | 6.6 | 1.2 | 0.10 | Two sides | 8.0 | 420 | 229 | 0.55 | 10.9 |
| 36 | 0.65 | 7.1 | 1.1 | 0.09 | One side | 8.0 | 420 | 229 | 0.55 | 10.9 |
| 37 | 0.65 | 9.6 | 1.8 | 0.08 | Two sides | 4.6 | 420 | 229 | 0.55 | 10.9 |
| 38 | 0.65 | 6.5 | 1.9 | 0.08 | Two sides | 4.4 | 420 | 229 | 0.55 | 10.9 |
| 39 | 0.65 | 6.3 | 1.6 | 0.11 | Two sides | 6.9 | 240 | 233 | <u>0.97</u> | 33.4 |
| 40 | 0.65 | 6.4 | 1 | 0.13 | Two sides | 13.0 | 524 | 232 | <u>0.44</u> | 7.0 |
| 41 | 0.65 | 7.1 | 1.2 | 0.11 | Two sides | 8.8 | 403 | 229 | 0.57 | 7.0 |
| 42 | 0.65 | 6.8 | 1.1 | 0.09 | Two sides | 8.0 | 128 | 229 | <u>1.79</u> | 45.0 |
| 43 | 0.65 | 6.3 | 1 | 0.13 | Two sides | 12.7 | 420 | 229 | 0.55 | 5.0 |
| 44 | 0.65 | 7.7 | 1.8 | 0.11 | Two sides | 5.8 | 420 | 229 | 0.55 | 6.0 |
| 45 | 0.65 | 7.5 | 1.5 | 0.13 | Two sides | 8.4 | 409 | 229 | 0.56 | 11.3 |
| 46 | 0.65 | 5.6 | 1 | 0.13 | Two sides | 12.9 | 401 | 229 | 0.57 | 11.6 |
| 47 | Trouble at time of manufacture, sample unable to be obtained | | | | | | | | | |
| 48 | 0.65 | 4.2 | 1.9 | 0.10 | Two sides | 5.2 | 399 | 229 | 0.57 | 11.7 |
| 49 | Trouble at time of manufacture, sample unable to be obtained | | | | | | | | | |
| 50 | 0.65 | 6.6 | 1 | 0.12 | Two sides | 11.9 | 413 | 229 | 0.55 | 11.2 |
| 51 | 0.65 | 4.9 | 1 | 0.11 | Two sides | 10.5 | 406 | 229 | 0.56 | 11.4 |
| 52 | 0.65 | 8.0 | 1.6 | 0.09 | Two sides | 5.9 | 407 | 229 | 0.56 | 11.4 |
| 53 | 0.65 | 7.9 | 1.3 | 0.09 | Two sides | 6.8 | 407 | 229 | 0.56 | 11.4 |
| 54 | 0.65 | 5.6 | 2 | 0.10 | Two sides | 4.8 | 410 | 229 | 0.56 | 11.3 |
| 55 | 0.65 | 6.8 | 1.4 | 0.11 | Two sides | 7.9 | 415 | 203 | 0.60 | 11.8 |

TABLE 4-2-continued

| Steel Sheet | Hole expandability λ (%) | Bending angle α (°) | Bending load F(N) | Hc × El | Hc × λ | Formula of bending angle (°) | Formula of bending load (N) | Remarks |
|---|---|---|---|---|---|---|---|---|
| 56 | Trouble at time of manufacture, sample unable to be obtained | | | | | | | |
| 57 | Trouble at time of manufacture, sample unable to be obtained | | | | | | | |
| 29 | 27.2 | 104.4 | 5820 | 4681 | 10828 | 70.1 | 3413 | Ex. |
| 30 | 28.4 | 72.3 | 6181 | 4611 | 11805 | 70.1 | 3852 | Ex. |
| 31 | 28.8 | 75.8 | 15578 | 4655 | 11672 | 59.2 | 10610 | Ex. |
| 32 | 30.1 | 88.5 | 15044 | 4698 | 11820 | 59.2 | 10304 | Ex. |
| 33 | 29.2 | 88.8 | 11450 | 4701 | 11437 | 62.2 | 7660 | Ex. |
| 34 | 32.0 | 59.8 | 20555 | 4591 | 13429 | 56.7 | 13875 | Ex. |
| 35 | 35.0 | 75.7 | 9004 | 4591 | 14688 | 65.9 | 6015 | Ex. |
| 36 | 34.0 | 72.0 | 7565 | 4591 | 14269 | 67.9 | 4950 | Ex. |
| 37 | 33.0 | 63.0 | 20582 | 4591 | 13849 | 56.7 | 13875 | Ex. |
| 38 | 34.0 | 62.4 | 22958 | 4591 | 14269 | 55.7 | 15430 | Ex. |
| 39 | 63.0 | 78.0 | 9479 | 2605 | 3120 | 59.2 | 7600 | Comp.ex. |
| 40 | 12.0 | 53.1 | 7513 | 3663 | 7857 | 70.1 | 7095 | Comp.ex. |
| 41 | 14.0 | 82.4 | 8635 | 2822 | 3205 | 65.9 | 5595 | Comp.ex. |
| 42 | 13.0 | 72.0 | 2543 | 5754 | 1662 | 67.9 | 777 | Comp.ex. |
| 43 | 10.0 | 103.6 | 6114 | 2098 | 4197 | 70.1 | 3955 | Comp.ex. |
| 44 | 11.0 | 72.5 | 20465 | 2518 | 4616 | 56.7 | 13875 | Comp.ex. |
| 45 | 13.0 | 92.3 | 13710 | 4639 | 5321 | 60.6 | 9365 | Comp.ex. |
| 46 | 15.0 | 105.1 | 5858 | 4671 | 6016 | 70.1 | 3486 | Comp.ex. |
| 47 | Trouble at time of manufacture, sample unable to be obtained | | | | | | | Comp.ex. |
| 48 | 13.0 | 67.0 | 21779 | 4678 | 5188 | 55.7 | 14913 | Comp.ex. |
| 49 | Trouble at time of manufacture, sample unable to be obtained | | | | | | | Comp.ex. |
| 50 | 13.0 | 63.2 | 6042 | 4624 | 5365 | 70.1 | 3775 | Comp.ex. |
| 51 | 13.2 | 58.9 | 5993 | 4651 | 5363 | 70.1 | 3615 | Comp.ex. |
| 52 | 11.4 | 54.2 | 15705 | 4647 | 4643 | 59.2 | 10660 | Comp.ex. |
| 53 | 14.2 | 53.0 | 10326 | 4647 | 5783 | 64.0 | 6835 | Comp.ex. |
| 54 | 15.6 | 51.3 | 24846 | 4634 | 6403 | 54.8 | 16820 | Comp.ex. |
| 55 | 10.4 | 49.2 | 12070 | 4897 | 4316 | 62.2 | 8235 | Comp.ex. |
| 56 | Trouble at time of manufacture, sample unable to be obtained | | | | | | | Comp.ex. |
| 57 | Trouble at time of manufacture, sample unable to be obtained | | | | | | | Comp.ex. |

TABLE 4-3

| Steel Sheet | Amount of C of surface soft part/ Amount of C at center part of sheet thickness | Pealite distance at soft part of surface layer (μm) | Sheet thickness (total thickness) (mm) | Sheet thickness (soft part of surface layer) (mm) | Position of soft part of surface layer | Thickness of surface layer per side/total thickness (%) | Average Vickers hardness of center part of sheet thickness Hc (Hv) | Average Vickers hardness of soft part of surface layer Hs (Hv) | Hs/Hc | Total elongation El (%) |
|---|---|---|---|---|---|---|---|---|---|---|
| 58 | 0.65 | 7.4 | 1.4 | 0.09 | Two sides | 6.6 | 395 | 193 | <u>0.49</u> | 5.0 |
| 59 | 0.65 | <u>2.9</u> | 1.4 | 0.10 | One side | 6.8 | 395 | 193 | <u>0.49</u> | 11.9 |
| 60 | 0.65 | <u>1.9</u> | 1.4 | 0.11 | Two sides | 8.0 | 395 | 193 | <u>0.49</u> | 11.9 |
| 61 | 0.65 | <u>7.2</u> | 1.4 | 0.13 | Two sides | 9.1 | 395 | 193 | <u>0.49</u> | 11.9 |
| 62 | Trouble at time of manufacture, sample unable to be obtained | | | | | | | | | |
| 63 | Trouble at time of manufacture, sample unable to be obtained | | | | | | | | | |
| 64 | <u>0.98</u> | 6.4 | 1.4 | <u>0.01</u> | Two sides | 0.4 | 395 | 201 | 0.51 | 11.9 |
| 65 | 0.4 | 8.6 | 1.4 | 0.22 | Two sides | <u>15.7</u> | 395 | 121 | <u>0.37</u> | 11.9 |
| 66 | 0.65 | 5.9 | 1.4 | 0.08 | Two sides | 5.8 | 234 | 210 | <u>0.90</u> | 18.0 |
| 67 | 0.65 | 7.3 | 1.4 | 0.09 | Two sides | 6.5 | 395 | 193 | <u>0.49</u> | 11.9 |
| 68 | 0.65 | 6.9 | 1.4 | 0.13 | Two sides | 9.0 | 271 | 193 | 0.71 | 16.6 |
| 69 | 0.65 | 7.1 | 1.4 | 0.11 | Two sides | 7.7 | 287 | 193 | <u>0.50</u> | 8.0 |
| 70 | 0.65 | 5.8 | 1.4 | 0.11 | Two sides | 8.1 | 395 | 163 | 0.41 | 11.9 |
| 71 | 0.65 | 8.5 | 1.4 | 0.11 | Two sides | 7.6 | 395 | 193 | <u>0.49</u> | 11.9 |
| 72 | 0.65 | 9.0 | 1.4 | 0.12 | Two sides | 8.7 | 348 | 193 | 0.55 | 13.7 |
| 73 | 0.65 | 3.6 | 1.4 | 0.11 | Two sides | 8.1 | 357 | 193 | 0.54 | 13.3 |
| 74 | 0.65 | 6.0 | 1.4 | 0.10 | Two sides | 7.2 | 338 | 193 | 0.57 | 14.0 |
| 75 | <u>0.98</u> | 6.3 | 1.4 | 0.10 | Two sides | 7.1 | 423 | 220 | 0.52 | 9.6 |
| 76 | 0.65 | 7.4 | 1.4 | 0.09 | Two sides | 6.7 | 212 | 193 | <u>0.92</u> | 18.9 |
| 77 | 0.65 | 7.9 | 1.4 | 0.10 | Two sides | 7.4 | 420 | 193 | <u>0.46</u> | 10.9 |
| 78 | 0.65 | 6.5 | 1.4 | 0.12 | Two sides | 8.4 | 420 | 193 | <u>0.46</u> | 8.2 |
| 79 | 0.65 | 6.9 | 1.4 | 0.09 | Two sides | 6.1 | 403 | 193 | <u>0.48</u> | 9.3 |
| 80 | 0.65 | 5.2 | 1.4 | 0.08 | Two sides | 6.0 | 418 | 212 | 0.51 | 9.8 |
| 81 | 0.65 | 8.0 | 1.4 | 0.09 | Two sides | 6.6 | 399 | 223 | 0.56 | 11.7 |
| 82 | 0.7 | 7.6 | 1.4 | 0.09 | Two sides | 6.4 | 367 | 192 | 0.52 | 12.9 |
| 83 | 0.75 | 7.9 | 1.4 | 0.05 | Two sides | 3.9 | 380 | 192 | 0.50 | 12.4 |

TABLE 4-3-continued

| | | | | | | | | | |
|---|---|---|---|---|---|---|---|---|---|
| 84 | 0.75 | 7.9 | 1.4 | 0.05 | Two sides | 3.9 | 380 | 192 | 0.50 | 12.4 |
| 85 | 0.75 | 7.9 | 1.4 | 0.05 | Two sides | 3.9 | 380 | 192 | 0.50 | 12.4 |
| 86 | 0.75 | 7.9 | 1.4 | 0.05 | Two sides | 3.9 | 380 | 192 | 0.50 | 12.4 |

| Steel Sheet | Hole expandability $\lambda$ (%) | Bending angle $\alpha$ (°) | Bending load F(N) | Hc × El | Hc × $\lambda$ | Formula of bending angle (°) | Formula of bending load (N) | Remarks |
|---|---|---|---|---|---|---|---|---|
| 58 | 12.0 | 68.7 | 11564 | 1974 | 4739 | 62.2 | 7736 | Comp.ex. |
| 59 | 28.4 | 59.0 | 11551 | 4691 | 11215 | 62.2 | 7736 | Comp.ex. |
| 60 | 26.4 | 59.1 | 11477 | 4691 | 10425 | 62.2 | 7736 | Comp.ex. |
| 61 | 28.4 | 55.0 | 11407 | 4691 | 11215 | 62.2 | 7736 | Comp.ex. |
| 62 | Trouble at time of manufacture, sample unable to be obtained | | | | | | | Comp.ex. |
| 63 | Trouble at time of manufacture, sample unable to be obtained | | | | | | | Comp.ex. |
| 64 | 30.4 | 3.6 | 11945 | 4691 | 12004 | 54.8 | 7736 | Comp.ex. |
| 65 | 30.4 | 115.0 | 6301 | 4691 | 12004 | 55.8 | 7736 | Comp.ex. |
| 66 | 26.4 | 68.2 | 11642 | 4207 | 6178 | 56.8 | 7736 | Comp.ex. |
| 67 | 30.4 | 67.9 | 11568 | 4691 | 12004 | 57.8 | 7736 | Ex. |
| 68 | 15.0 | 64.0 | 7999 | 4492 | 4065 | 58.8 | 5378 | Comp.ex. |
| 69 | 26.2 | 80.6 | 11270 | 3095 | 10136 | 59.8 | 7547 | Ex. |
| 70 | 17.0 | 100.7 | 11394 | 4691 | 6713 | 60.8 | 7736 | Comp.ex. |
| 71 | 30.4 | 79.1 | 11503 | 4691 | 12004 | 61.8 | 7736 | Ex. |
| 72 | 19.7 | 91.0 | 10128 | 4752 | 6850 | 62.8 | 6693 | Comp.ex. |
| 73 | 16.0 | 52.1 | 10411 | 4754 | 5710 | 6.8 | 6883 | Comp.ex. |
| 74 | 15.0 | 75.4 | 9917 | 4744 | 5066 | 64.8 | 6495 | Comp.ex. |
| 75 | 33.0 | 68.0 | 11922 | 4061 | 13959 | 64.8 | 6495 | Ex. |
| 76 | 34.0 | 70.1 | 6324 | 4005 | 7208 | 65.8 | 4666 | Ex. |
| 77 | 10.0 | 77.6 | 12207 | 4591 | 4197 | 66.8 | 8355 | Comp.ex. |
| 78 | 32.0 | 87.3 | 12143 | 3441 | 13429 | 67.8 | 8355 | Comp.ex. |
| 79 | 28.0 | 64.2 | 11829 | 3750 | 11292 | 68.8 | 7940 | Comp.ex. |
| 80 | 28.9 | 73.5 | 11775 | 4096 | 12080 | 69.8 | 7886 | Ex. |
| 81 | 26.6 | 76.3 | 11743 | 4679 | 10615 | 70.8 | 7838 | Ex. |
| 82 | 27.6 | 72.1 | 10792 | 4747 | 10137 | 71.8 | 7105 | Ex. |
| 83 | 27.7 | 77.9 | 11293 | 4729 | 10524 | 62.2 | 7386 | Ex. |
| 84 | 13.0 | 77.9 | 11293 | 4729 | 4939 | 62.2 | 7386 | Comp.ex. |
| 85 | 12.0 | 77.9 | 11293 | 4729 | 4559 | 62.2 | 7386 | Comp.ex. |
| 86 | 14.0 | 77.9 | 11293 | 4729 | 5319 | 62.2 | 7386 | Comp.ex. |

The steel sheet of the present invention was confirmed as having excellent properties.

INDUSTRIAL APPLICABILITY

As explained above, according to the present invention, it is possible to provide high strength steel sheet suitable as a structural member for an automobile etc. which has high formability and bending load while is excellent in bendability. The high strength steel sheet of the present invention is excellent in impact deformation property, so the present invention has high applicability in the automobile industry and steel sheet manufacturing and processing industry.

The invention claimed is:

1. A high strength steel sheet comprising a center part of sheet thickness and a surface soft part formed at one side or both sides of the center part of sheet thickness,
   wherein
   at a cross-section of the high strength steel sheet,
   metal structures at the center part of sheet thickness comprise, by area ratio, tempered martensite: 85% or more, one or more of ferrite, bainite, pearlite, and retained austenite: total of less than 15%, and as-quenched martensite: less than 5%,
   metal structures of the surface soft part comprise, by area ratio, ferrite: 65% or more, pearlite: 5% or more and less than 20%, one or more of tempered martensite, bainite, and retained austenite: total of less than 10%, and as-quenched martensite: less than 5%,
   a thickness of the surface soft part formed at one side or both sides is more than 10 μm and 15% or less of the sheet thickness,
   an average distance between pearlite and pearlite at the surface soft part is 3 μm or more,
   a Vickers hardness (Hc) of the center part of sheet thickness and a Vickers hardness (Hs) of the surface soft part satisfy 0.50≤Hs/Hc≤0.75,
   a chemical composition of the center part of sheet thickness comprises, by mass %,
   C: 0.10% or more and 0.30% or less,
   Si: 0.01% or more and 2.5% or less,
   Al: 0% or more and 2.50% or less,
   Mn: 0.1% or more and 10.0% or less,
   P: 0.10% or less,
   S: 0.050% or less,
   N: 0.0100% or less,
   O: 0.0060% or less,
   Cr: 0% or more and 5.0% or less,
   Mo: 0% or more and 1.00% or less,
   B: 0% or more and 0.0100% or less,
   Nb: 0% or more and 0.30% or less,
   Ti: 0% or more and 0.30% or less,
   V: 0% or more or 0.50% or less,
   Ni: 0% or more and 1.00% or less,
   Cu: 0% or more and 1.00% or less,
   Ca: 0% or more and 0.040% or less,
   Mg: 0% or more and 0.040% or less,
   REMs: 0% or more and 0.040% or less and
   a balance of Fe and impurities.

2. The high strength steel sheet according to claim 1, wherein the chemical composition of the center part of the sheet thickness comprises, by mass %, one or more elements selected from Cr: 0.1% or more and 5.0% or less,
Mo: 0.01% or more and 1.00% or less,
B: 0.0001% or more and 0.0100% or less,
Nb: 0.001% or more and 0.30% or less,
Ti: 0.001% or more and 0.30% or less,
V: 0.001% or more and 0.50% or less,
Ni: 0.0001% or more and 1.00% or less,
Cu: 0.001% or more and 1.00% or less,
Ca: 0.001% or more and 0.040% or less,
Mg: 0.001% or more and 0.040% or less, and
REMs: 0.001% or more and 0.040% or less.

3. The high strength steel sheet according to claim 1, wherein a content of C of the surface soft part is 0.9 time or less of the content of C of the center part of the sheet thickness.

4. The high strength steel sheet according to claim 1, wherein the high strength steel sheet comprises a hot dip galvanized layer on its surface.

5. The high strength steel sheet according to claim 1, wherein the high strength steel sheet comprises a hot dip galvannealed layer on its surface.

6. The high strength steel sheet according to claim 2, wherein a content of C of the surface soft part is 0.9 time or less of the content of C of the center part of the sheet thickness.

7. The high strength steel sheet according to claim 2, wherein the high strength steel sheet comprises a hot dip galvanized layer on its surface.

8. The high strength steel sheet according to claim 3, wherein the high strength steel sheet comprises a hot dip galvanized layer on its surface.

9. The high strength steel sheet according to claim 2, wherein the high strength steel sheet comprises a hot dip galvannealed layer on its surface.

10. The high strength steel sheet according to claim 3, wherein the high strength steel sheet comprises a hot dip galvannealed layer on its surface.

* * * * *